US009912407B2

(12) United States Patent
Aida

(10) Patent No.: US 9,912,407 B2
(45) Date of Patent: Mar. 6, 2018

(54) OPTICAL RELAY DEVICE, OPTICAL COMMUNICATION SYSTEM, OPTICAL RELAY METHOD, AND STORAGE MEDIUM

(71) Applicant: NEC Corporation, Tokyo (JP)

(72) Inventor: Ryuji Aida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/128,374

(22) PCT Filed: Feb. 27, 2015

(86) PCT No.: PCT/JP2015/001037
§ 371 (c)(1),
(2) Date: Sep. 22, 2016

(87) PCT Pub. No.: WO2015/145985
PCT Pub. Date: Oct. 1, 2015

(65) Prior Publication Data
US 2017/0126326 A1 May 4, 2017

(30) Foreign Application Priority Data

Mar. 27, 2014 (JP) ................................ 2014-065013

(51) Int. Cl.
*H04B 10/299* (2013.01)
*H04B 10/079* (2013.01)
(Continued)

(52) U.S. Cl.
CPC ....... *H04B 10/299* (2013.01); *H04B 10/0793* (2013.01); *H04B 10/296* (2013.01); *H04J 14/0221* (2013.01)

(58) Field of Classification Search
CPC ............ H04B 10/29–10/2912; H04B 10/294– 10/296; H04B 10/299;
(Continued)

(56) References Cited

U.S. PATENT DOCUMENTS 6,411,411 B1\* 6/2002 Okazaki .............. H04J 14/0221
359/578
7,292,787 B1\* 11/2007 Kai ........................ G02F 1/113
398/83
(Continued)

FOREIGN PATENT DOCUMENTS

EP  1330055 A2  7/2003
EP  1942565 A2  7/2008
(Continued)

OTHER PUBLICATIONS

International Search Report, Corresponding to PCT/JP2015/001037, dated Apr. 7, 2015, 2 pp.
(Continued)

*Primary Examiner* — David Payne
*Assistant Examiner* — Casey Kretzer
(74) *Attorney, Agent, or Firm* — Wilmer Cutler Pickering Hale and Dorr LLP

(57) ABSTRACT

An optical relay device is provided which is capable of outputting control signal light without equipping a light source for the control signal light and capable of flexibly managing and changing a wavelength of the control signal light in accordance with a state of a network. The optical relay device includes an optical receiving unit that receives a wavelength multiplexed optical signal, a control unit that specifies a first wavelength and outputting notification information, and a processing unit that selects an optical signal having the first wavelength from the received wavelength multiplexed optical signal, applying intensity-modulation in accordance with the notification information to the selected optical signal, adding the intensity-modulated optical signal back to the wavelength multiplexed optical signal, and outputting the wavelength multiplexed optical signal.

16 Claims, 22 Drawing Sheets

(51) Int. Cl.
*H04B 10/296* (2013.01)
*H04J 14/02* (2006.01)

(58) Field of Classification Search
CPC ............... H04B 10/80; H04B 10/0793; H04J 14/201–14/022; H04J 14/0201–14/022; H04J 14/0221
See application file for complete search history.

(56) References Cited

U.S. PATENT DOCUMENTS

| | | | |
|---|---|---|---|
| 2003/0011855 A1 | 1/2003 | Fujiwara | |
| 2003/0137720 A1 | 7/2003 | Onaka et al. | |
| 2005/0259998 A1* | 11/2005 | Fujieda | H04B 10/0777 398/186 |
| 2008/0137179 A1 | 6/2008 | Li et al. | |
| 2008/0193139 A1 | 8/2008 | Bettesh | |
| 2010/0014874 A1* | 1/2010 | Kawanishi | G02F 1/225 398/187 |
| 2011/0085798 A1* | 4/2011 | Kikuchi | H04B 10/0775 398/34 |
| 2012/0224253 A1* | 9/2012 | Kobayashi | H01S 3/1301 359/334 |

FOREIGN PATENT DOCUMENTS

| | | |
|---|---|---|
| GB | 2377839 A | 1/2003 |
| JP | H09-8773 A | 1/1997 |
| JP | H09-83434 A | 3/1997 |
| JP | 2003-032192 A | 1/2003 |
| JP | 2003-218804 A | 7/2003 |
| JP | 2008-148286 A | 6/2008 |
| JP | 2008-521539 A | 6/2008 |
| JP | 2010-081297 A | 4/2010 |
| JP | 2013-046166 A | 3/2013 |

OTHER PUBLICATIONS

Manish Sharma et al., IEEE Journal of Lightwave Technology, "WDM Ring Network Using a Centralized Multiwavelength Light Source and Add-Drop Multiplexing Filters," Jun. 1997, vol. 15, No. 6, pp. 917-929, 13 pp.

* cited by examiner

OPTICAL RELAY DEVICE, OPTICAL COMMUNICATION SYSTEM, OPTICAL RELAY METHOD, AND STORAGE MEDIUM

CROSS-REFERENCE TO RELATED APPLICATIONS

The present application is a national stage application of International Application No. PCT/JP2015/001037 entitled "Optical Relay Device, Optical Communication System, Optical Relay Method, and Storage Medium," filed on Feb. 27, 2015, which claims the benefit of priority from Japanese Patent Application No. JP2014-065013, filed on Mar. 27, 2014, the disclosures of which are incorporated herein in their entirety by reference thereto.

TECHNICAL FIELD

The present invention relates to an optical relay device, an optical communication system, an optical relay method, and a storage medium.

BACKGROUND ART

With increase of traffic, in an optical communication system, a wider bandwidth of a line and a higher functionality of a network are desired. Therefore, techniques such as OADM (Optical Add-Drop Multiplexer) and ROADM (Reconfigurable Optical Add-Drop Multiplexer) are applied to the optical communication system. Optical communication systems that use OADM or ROADM are disclosed in PTL 1 and PTL 2, for example.

In OADM and ROADM systems, WDM (Wavelength Division Multiplexing) communication is used and a transmission device inputs a client signal into a submarine cable as a wavelength multiplexed optical signal, and a plurality of paths are accommodated in a single optical fiber to improve flexibility of the network, for example.

In OADM and ROADM systems, an optical transmitter generally makes an optical control signal for controlling an optical relay device be included in a wavelength multiplexed optical signal to control the optical relay device. Further, an optical relay device may include an optical control signal in a wavelength multiplexed optical signal in order to indicate a state of the optical relay device.

PTL 3 discloses a technique in which a wavelength multiplexing transmitter multiplexes a plurality of optical signals containing data and a monitoring optical signal (control signal light) containing information for performing an adjustment or the like of a gain of an optical relay device and transmits the wavelength multiplexed signal to an optical fiber. The wavelength multiplexing transmitter described in PTL 3 includes a plurality of light sources which output a plurality of respective optical signals and a monitoring light source which outputs a monitoring optical signal (control signal light), and generates a wavelength multiplexed signal by multiplexing the plurality of optical signals output from the plurality of light sources and the monitoring light source.

CITATION LIST

Patent Literature

[PTL 1] Japanese Laid-open Patent Publication No. 2013-046166

[PTL 2] Japanese Laid-open Patent Publication No. 2010-081297

[PTL 3] Japanese Laid-open Patent Publication No. H9-8773

SUMMARY OF INVENTION

Technical Problem

A wavelength multiplexing transmitter that includes a light source for a monitoring optical signal (control signal light) as described in PTL 3 cannot readily change a wavelength of the monitoring optical signal (control signal light) and cannot flexibly manage and change the wavelength of the monitoring optical signal in accordance with a state of a network.

Further, an optical relay device may be installed, for example, underwater or in other places where it may be difficult to equip the optical relay device with a light source. For this reason, the technique described in PTL 1, which requires a light source for a monitoring optical signal (control signal light), may not be applied to an optical relay device that transmits a monitoring optical signal (control signal light).

An object of the present invention is to provide an optical relay device and the like, that solves the problems and is capable of outputting control signal light without equipping a light source for the control signal light and capable of flexibly managing and changing a wavelength of the control signal light in accordance with a state of a network.

Solution to Problem

An optical relay device of the present invention includes optical receiving means for receiving a wavelength multiplexed optical signal; control means for specifying a first wavelength and outputting notification information; and processing means for selecting an optical signal having the first wavelength from the received wavelength multiplexed optical signal, applying intensity-modulation in accordance with the notification information to the selected optical signal, adding the intensity-modulated optical signal back to the wavelength multiplexed optical signal, and outputting the wavelength multiplexed optical signal.

An optical communication system of the present invention includes an optical transmitter and an optical relay device, the optical transmitter including: a plurality of transmitting means for outputting optical signals having different wavelengths, the optical signals being available for data communication; and transmitting-side processing means for multiplexing the plurality of output optical signals into a wavelength multiplexed optical signal and transmitting the wavelength multiplexed optical signal; the optical relay device including: optical receiving means for receiving the wavelength multiplexed optical signal; receiving-side control means for specifying a first wavelength and outputting notification information; and receiving-side processing means for selecting an optical signal having the first wavelength from the received wavelength multiplexed optical signal, applying intensity-modulation in accordance with the notification information to the selected optical signal, adding the intensity-modulated optical signal back to the wavelength multiplexed optical signal, and outputting the wavelength multiplexed optical signal.

An optical relay method of the present invention includes: receiving a wavelength multiplexed optical signal; specifying a first wavelength and outputting notification information; and selecting an optical signal having the first wavelength from the received wavelength multiplexed optical signal, applying intensity-modulation in accordance with the notification information to the selected optical signal, adding the intensity-modulated optical signal back to the wavelength multiplexed optical signal and outputting the wavelength multiplexed optical signal.

A computer-readable storage medium of the present invention stores a program for causing a computer of an optical relay device to execute the steps of: receiving a wavelength multiplexed optical signal; specifying a first wavelength and outputting notification information; and selecting an optical signal having the first wavelength from the received wavelength multiplexed optical signal, applying intensity-modulation in accordance with the notification information to the selected optical signal, adding the intensity-modulated optical signal back to the wavelength multiplexed optical signal, and outputting the wavelength multiplexed optical signal.

Advantageous Effects of Invention

The optical relay device, the optical communication system, the optical relay method, and the storage medium according to the present invention have the advantageous effects of being capable of outputting control signal light without equipping a light source for the control signal light and capable of flexibly managing and changing a wavelength of the control signal light in accordance with a state of a network.

DESCRIPTION OF EMBODIMENTS

First Exemplary Embodiment

Figure 1:
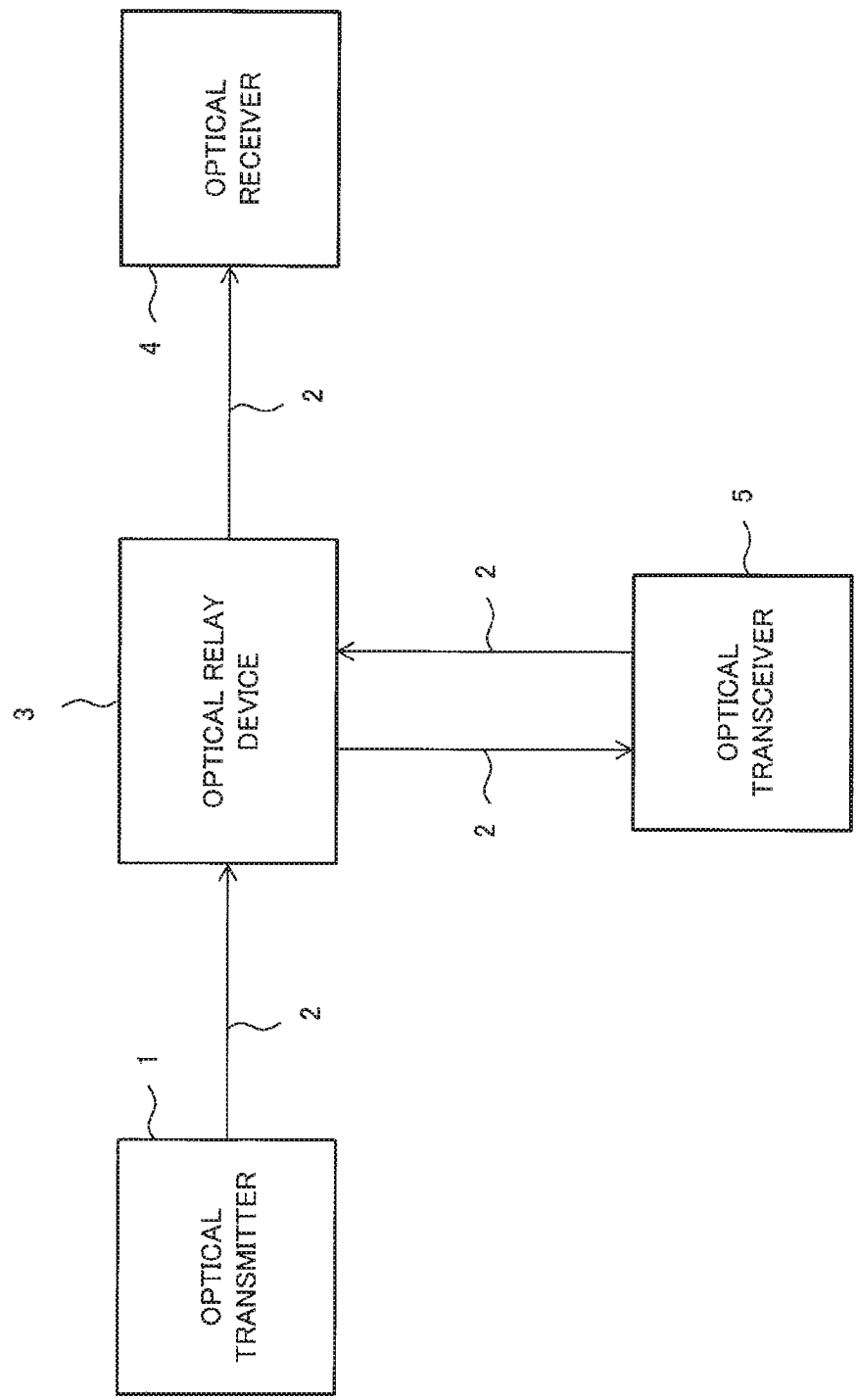
FIG. 1 illustrates an exemplary configuration of an optical communication system according to a first exemplary embodiment of the present invention.

Referring to drawings, an overview of a first exemplary embodiment of the present invention will be provided. Note that reference numerals in the overview are given to elements as illustrative for convenience for facilitating understanding of the present invention and the specifics in the overview are not intended to be limitative.

FIG. 1 illustrates an exemplary configuration of an optical communication system according to the first exemplary embodiment of the present invention. As illustrated in FIG. 1, the optical communication system includes an optical transmitter 1 which transmits a wavelength multiplexed optical signal, a transmission path 2 through which the wavelength multiplexed optical signal is transmitted, and an optical relay device 3 which multiplexes and separates the wavelength multiplexed optical signal. The optical communication system also includes an optical receiver 4 which receives a wavelength multiplexed optical signal and an optical transceiver 5 which transmits and receives the wavelength multiplexed optical signal.

Figure 2:
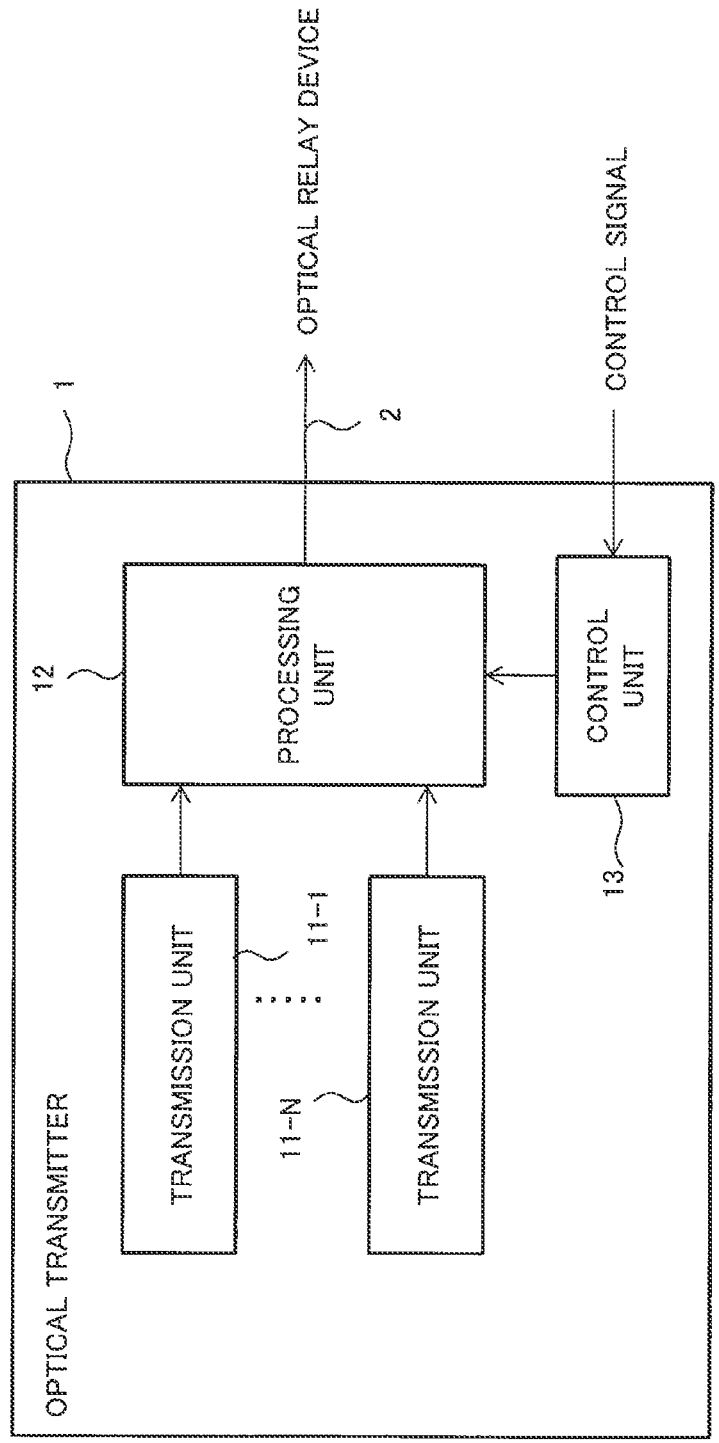
FIG. 2 is a diagram illustrating an exemplary configuration of an optical transmitter 1 according to the first exemplary embodiment of the present invention.

FIG. 2 is a diagram illustrating an exemplary configuration of the optical transmitter 1. The optical transmitter 1 includes a plurality of transmission units 11-1 to 11-N (which will be referred to as "transmission units 11" unless a specific distinction is necessary), a processing unit 12 and a control unit 13.

The plurality of transmission units 11-1 to 11-N transmit optical signals of different wavelengths. The optical signals transmitted from the transmission units 11 can be phase-modulated, for example, to contain information (data). At least one of the plurality of optical signals output from the plurality of transmission units 11-1 to 11-N is used as an optical signal for data.

The wavelength used for an optical signal for data is changed in response to client needs, occurrence of a failure, or the like. If there are multiple clients, at least one wavelength is allocated to each of the clients as the wavelength for an optical signal for carrying information (data). In this case, the wavelength allocated to a first client can be changed to another wavelength (for example an unused wavelength) to meet needs of the first client. Further, the wavelength allocated to the first client and the wavelength allocated to a second client can be replaced with one another. Moreover, in the event of a failure in the transmission unit 11 transmitting the wavelength allocated to the first client, the wavelength allocated to the first client can be changed to another wavelength (a wavelength transmitted from another, unfailed transmission unit 11).

The processing unit 12 selects an optical signal having a given wavelength from among the plurality of optical signals output from the plurality of transmission units 11 in response to an instruction from the control unit 13 and intensity-modulates the selected optical signal in accordance with the bit pattern of control information. Note that the control information is a signal for controlling another device on the transmission network and is a signal for instructing the optical relay device 3 or the optical receiver 4, for example, to change an optical signal channel. After intensity-modulating the selected optical signal, the processing unit 12 multiplexes the plurality of optical signals and outputs the optical signals as a wavelength multiplexed optical signal.

The processing unit 12 may be a wavelength selector switch described in Japanese Patent Publication No. 4748514, for example. The wavelength selector switch is capable of dropping a light wave with a desired wavelength from among a plurality of input light waves. The wavelength selector switch is also capable of adding a light wave having a desired wavelength to a plurality of input light waves, multiplexing the added light wave together with the plurality of input light waves and outputting them as a wavelength multiplexed optical signal. The wavelength selector switch includes an optical waveguide circuit formed on a substrate and control means for controlling and switching among optical traveling paths by applying a heat change to the optical waveguide circuit and is capable of properly controlling the wavelength of a light wave to be dropped and the wavelength of a light wave to be added.

The wavelength selector switch selects an optical signal having a given wavelength from among a plurality of optical signal output from the plurality of transmission units 11 and drops (or does not drop) the optical signal in accordance with the bit pattern of control information, thereby allowing the optical signal having the given wavelength to be used as a control signal light. When a bit of the control information is "0" (while bits of the control information are "0"), the wavelength selector switch drops the optical signal having the given wavelength among a plurality of optical signals output from the plurality of transmission units 11; when the bit is a "1" (while bits of the control information are "1"), the selector switch does not drop the optical signal having the given wavelength. In other words, the optical signal having the given wavelength is present only when a bit of the control information is "1". Accordingly, a device that receives the wavelength multiplexed optical signal can decode the bit pattern of the control information by detecting the given wavelength included in the wavelength multiplexed optical signal.

The control unit 13 controls the processing unit 12 to intensity-modulate an optical signal having a given wavelength. Specifically, the control unit 13 indicates to the processing unit 12 a given wavelength to be used as control signal light among a plurality of optical signals output from the plurality of transmission units 11. The control unit 13 then instructs the processing unit 12 to drop parts of an optical signal having the given wavelength to be used as control signal light in accordance with the bit pattern of control information for controlling a device (for example the optical relay device 3) that receives the wavelength multiplexed optical signal. The control unit 13 instructs the processing unit 12 to drop the optical signal having the given wavelength in response to a bit "0" of the bit pattern of the control information. On the other hand, when a bit of the bit pattern of the control information is "1", the control unit 13 does not instruct the processing unit 12 to drop the optical signal having the given wavelength.

The optical signal having the given wavelength used as control signal light is an optical signal that is not used as an optical signal for data among optical signals output from the transmission unit 11. The control unit 13 chooses a wavelength for control signal light based on a control signal from an external controller (not depicted). The external controller indicates wavelengths that are used as optical signals for data, for example, to the control unit 13. Based on the indication, the control unit 13 chooses at least one of the wavelengths that are not used for data as the wavelength for control signal light.

Because the processing unit 12 has the function of selecting an arbitrary wavelength in a wavelength multiplexed optical signal as described above, the processing unit 12 can change the wavelength used for control signal light in response to a variation in wavelength for the control signal light. The optical transmitter 1 according to the first exemplary embodiment therefore can flexibly change the wavelength of control signal light when the wavelength of an optical signal for data is changed in response to needs of a client or a state of the network such as occurrence of a failure and the wavelength of the control signal light needs to be changed accordingly.

Figure 3:
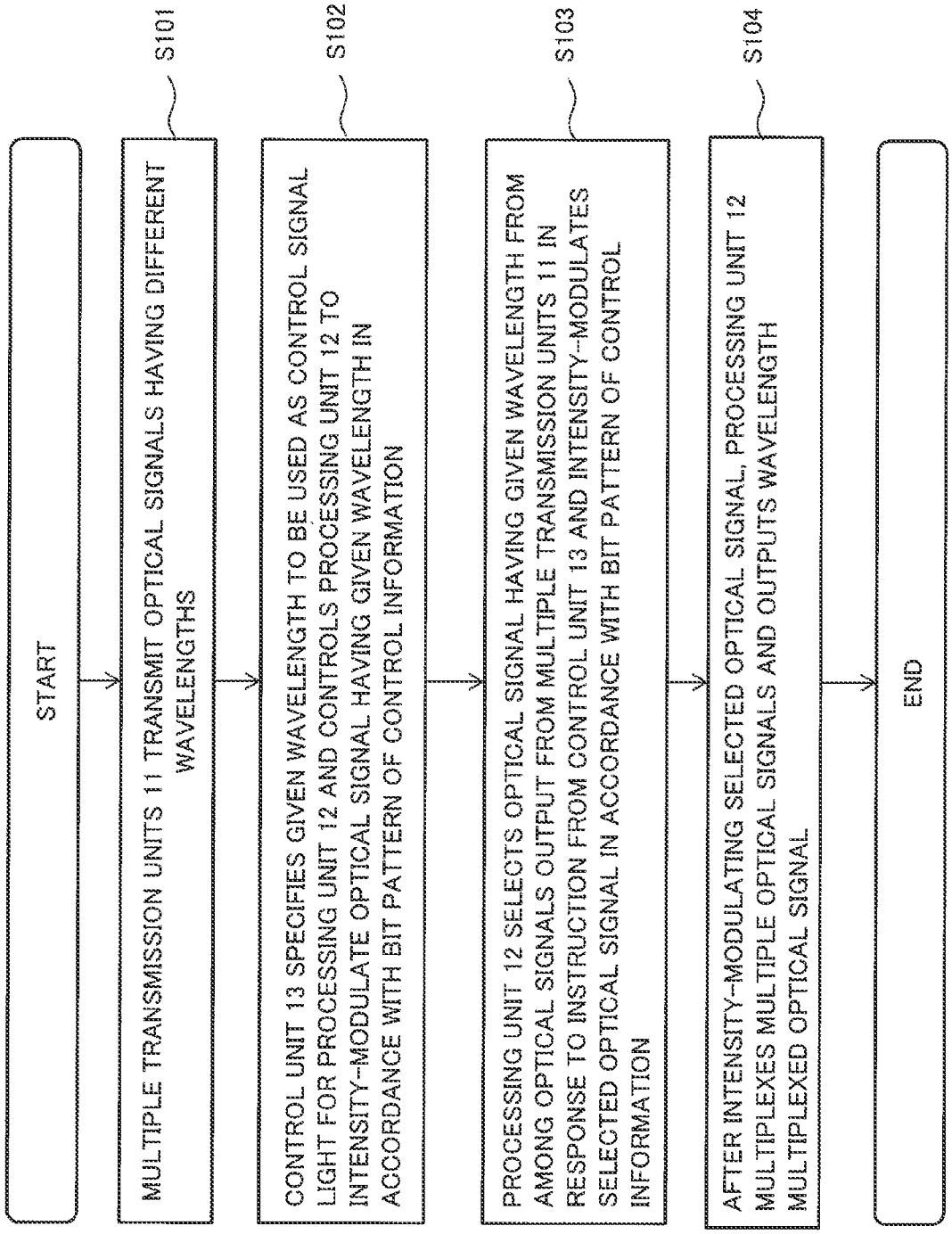
FIG. 3 is a flowchart illustrating an exemplary operation of the optical transmitter 1 according to the first exemplary embodiment of the present invention.

FIG. 3 is a flowchart illustrating an exemplary operation of the optical transmitter 1 according to the first exemplary embodiment of the present invention. In FIG. 3, the plurality of transmission units 11-1 to 11-N transmit optical signals having different wavelengths (S101).

The control unit 13 specifies a given wavelength to be used as control signal light for the processing unit 12 and controls the processing unit 12 in such a way to intensity-modulate an optical signal having the given wavelength in accordance with the bit pattern of control information (S102). Specifically, the control unit 13 instructs the control unit 12 to drop the optical signal having the given wavelength in response to a bit "0" of the bit pattern of the control information.

In response to the instruction from the control unit 13, the processing unit 12 selects an optical signal having the given wavelength from among a plurality of optical signals output from the plurality of transmission units 11 and intensity-modulates the selected optical signal in accordance with the bit pattern of the control information (S103).

After intensity-modulating the selected optical signal, the processing unit 12 multiplexes the plurality of optical signals and outputs them as a wavelength multiplexed optical signal (S104).

As described above, the optical transmitter 1 uses the processing unit 12 to select a given wavelength among a plurality of optical signals output from the plurality of transmission units 11 and drops (or does not drop) the optical signal having the given wavelength in accordance with the bit pattern of control information. The optical transmitter 1 therefore can flexibly change the wavelength of control signal light when the wavelength of an optical signal for data is changed in response to needs of a client or a state of the network such as occurrence of a failure and the wavelength of the control signal light needs to be changed accordingly.

Second Exemplary Embodiment

Figure 4:
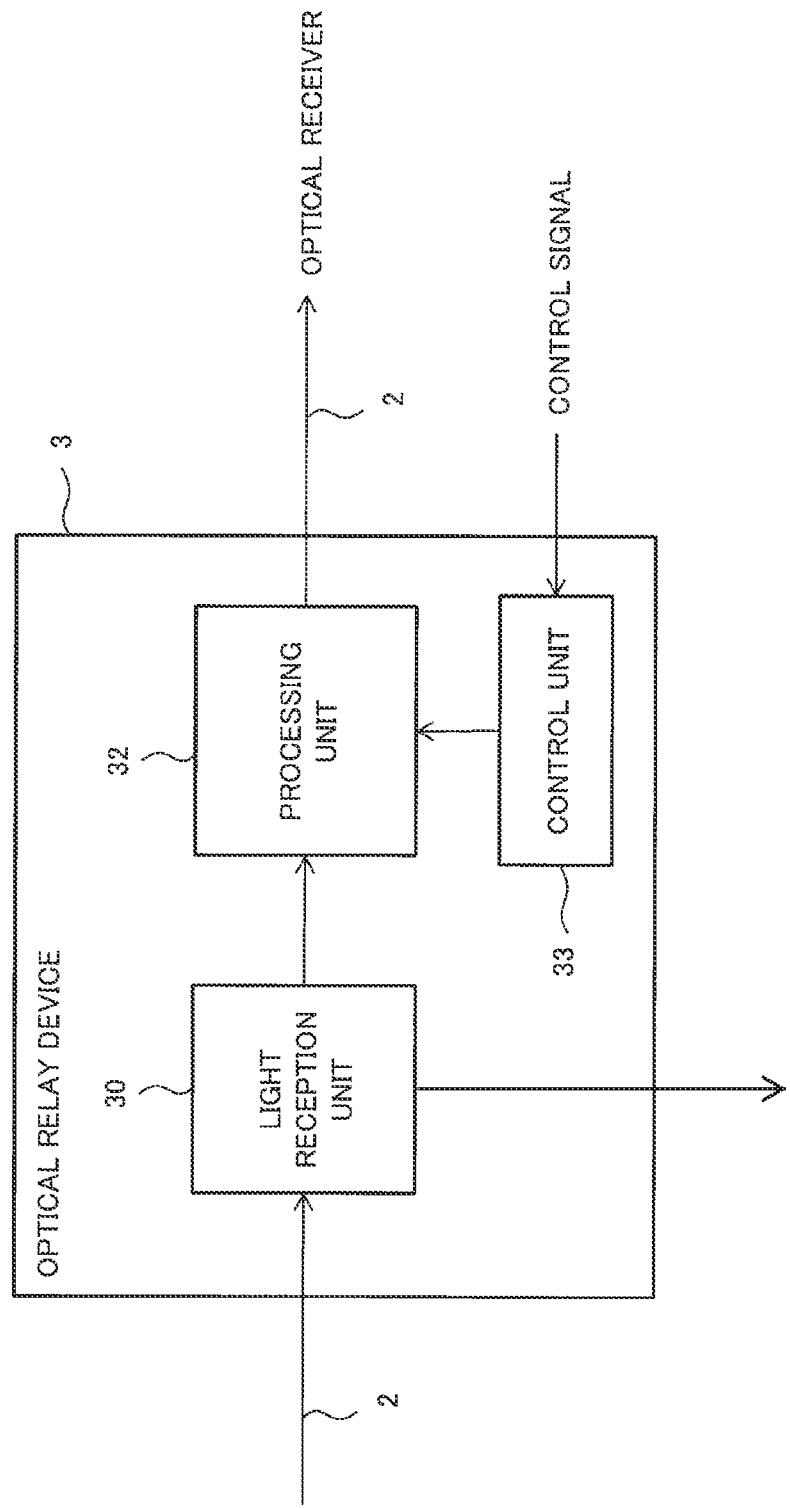
FIG. 4 is a diagram illustrating an exemplary configuration of an optical relay device 3 according to a second exemplary embodiment of the present invention.

Referring to drawings, an overview of a second exemplary embodiment will be provided. An exemplary configuration of an optical communication system according to the second exemplary embodiment is similar to the configuration in FIG. 1. FIG. 4 is a diagram illustrating an exemplary configuration of an optical relay device 3. The optical relay device 3 includes a light reception unit 30, a processing unit 32 and a control unit 33.

The light reception unit 30 receives a wavelength multiplexed optical signal transmitted from an optical transmitter 1 through a transmission path 2 and outputs the wavelength multiplexed optical signal to the processing unit 32. Note that the light reception unit 30 may be an optical branching unit. In that case, the optical branching unit separates the wavelength multiplexed optical signal input through the transmission path 2 into two and outputs one wavelength multiplexed optical signal to the processing unit 32 and another wavelength multiplexed optical signal to other external device (for example, an optical transceiver 5). The other wavelength multiplexed optical signal is subjected to predetermined processing at another device (not depicted) included in the optical relay device 3 before it is output to the optical transceiver 5. Note that if the other wavelength multiplexed optical signal does not need to be subjected to predetermined processing, the signal is directly output to other optical transceiver 5.

In response to an instruction from the control unit 33, the processing unit 32 selects an optical signal having a given wavelength included in a wavelength multiplexed optical signal and filters light power of the selected optical signal in accordance with the bit pattern of notification information. The processing unit 32 outputs a wavelength multiplexed optical signal including the optical signal having the given wavelength which has been intensity-modulated in accordance with the bit pattern of the notification information to the transmission path 2.

The processing unit 32 described above has the function of filtering and outputting light power having a given wavelength included in a wavelength multiplexed optical signal. The processing unit 32 drops (or does not drop) the optical signal having the given wavelength included in the wavelength multiplexed optical signal in accordance with the bit pattern of notification information, thereby using the optical signal having the given wavelength as control signal light. Specifically, the processing unit 32 drops the optical signal having the given wavelength when a bit of the notification information is "0" (while bits of the notification information are "0"); when the bit is "1" (while bits of the notification information are "1"), the processing unit 32 does not drop the optical signal having the given wavelength. Note that the control signal light transmitted from the optical relay device 3 is a signal for indicating a state (for example a failure state) of the optical relay device 3 to an optical receiver 4.

As in the first exemplary embodiment, the processing unit 32 can use the wavelength selector switch described in Japanese Patent Publication No. 4748514, for example. The wavelength selector switch is capable of separating an input wavelength multiplexed optical signal into a plurality of light waves having different wavelengths and dropping a light wave of a desired wavelength among the plurality of light waves into which the signal is separated. Further, the wavelength selector switch is capable of adding a light wave having a desired wavelength to the plurality of separated light waves, multiplexing the plurality of separated light waves with the added light wave and outputting them as a wavelength multiplexed optical signal. The processing unit 32 transmits the wavelength multiplexed optical signal including the optical signal having the given wavelength parts of which have been dropped in accordance with the bit pattern of the notification information to a device (for example an optical receiver 4) to which the state of the optical relay device 3 is to be indicated through the transmission path 2.

The control unit 33 generates notification information for indicating a state (for example a failure state) of the optical relay device 3. In order to generate the notification information, the control unit 33 collects information such as a failure state from devices included in the optical relay device 3.

In addition, the control unit 33 controls the processing unit 32 in such a way to intensity-modulate an optical signal having a given wavelength in a wavelength multiplexed optical signal received at the light reception unit 30. Specifically, the control unit 33 chooses a given wavelength to be used as control signal light from among a plurality of wavelengths included in the wavelength multiplexed optical signal. The control unit 33 then instructs the processing unit 32 to drop parts of the optical signal having the given wavelength in accordance with the bit pattern of generated notification information. The control unit 33 instructs the processing unit 32 to drop the optical signal having the given wavelength in response to a bit "0" of the bit pattern of the notification information. Note that when a bit of the bit pattern of the notification information is "1", the control unit 33 does not instruct to drop the optical signal having the given wavelength.

Like the control information in the first exemplary embodiment, the optical signal having the given wavelength used as notification information is an optical signal that is not used as an optical signal for data. Based on a control signal from an external controller (not depicted), the control unit 33 chooses a wavelength for control signal light. The control signal is a signal for indicating at least one of optical signals that are not used as optical signals for data to the control unit 33.

Figure 5:
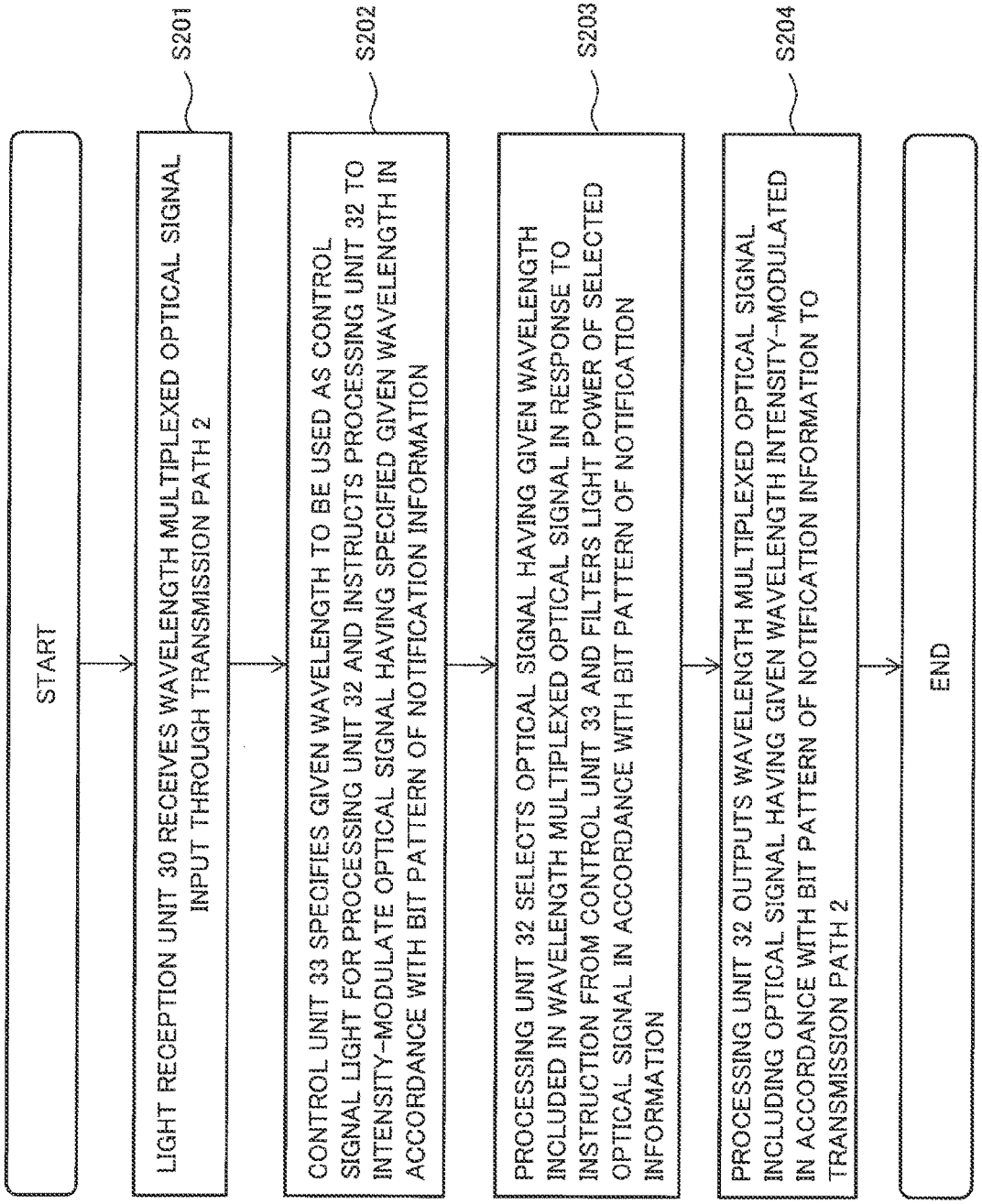
FIG. 5 is a flowchart illustrating an exemplary operation of the optical relay device 3 according to the second exemplary embodiment of the present invention.

FIG. 5 is a flowchart illustrating an exemplary operation of the optical relay device 3 according to the second exemplary embodiment. In FIG. 5, the light reception unit 30 receives a wavelength multiplexed optical signal input through the transmission path 2 (S201).

The control unit 33 specifies a given wavelength to be used as control signal light for the processing unit 32 and instructs the processing unit 32 to intensity-modulate an optical signal having the specified given wavelength in accordance with the bit pattern of notification information (S202). Specifically, the control unit 33 instructs the processing unit 32 to drop an optical signal having the given wavelength in response to a bit "0" of the bit pattern of the notification information.

In response to the instruction from the control unit 33, the processing unit 32 selects an optical signal having the given wavelength included in a wavelength multiplexed optical signal and filters light power of the selected optical signal in accordance with the bit pattern of the notification information (S203).

The processing unit 32 outputs the wavelength multiplexed optical signal including the optical signal having the given wavelength that has been intensity-modulated in accordance with the bit pattern of the notification information to the transmission path 2 (S204).

As described above, the optical relay device 3 uses the processing unit 32 to filter the optical signal having the wavelength selected from the wavelength multiplexed optical signal based on the bit pattern of notification information, thereby including the optical signal (control signal light) that corresponds to the notification information into the wavelength multiplexed optical signal. The optical relay device 3 thus can output the control signal light without needing a light source for the control signal light.

Further, because the processing unit 32 of the optical relay device 3 is capable of selecting a given wavelength from a wavelength multiplexed optical signal to perform the process described above, the processing unit 32 can flexibly respond to the need to change the wavelength of control signal light that arises due to needs of a client or a state of the network such as occurrence of a failure.

Third Exemplary Embodiment

Referring to drawings, an overview of a third exemplary embodiment will be provided. Note that descriptions of configurations of the third exemplary embodiment that are similar to those of the first and second exemplary embodiments will be omitted.

Figure 6:
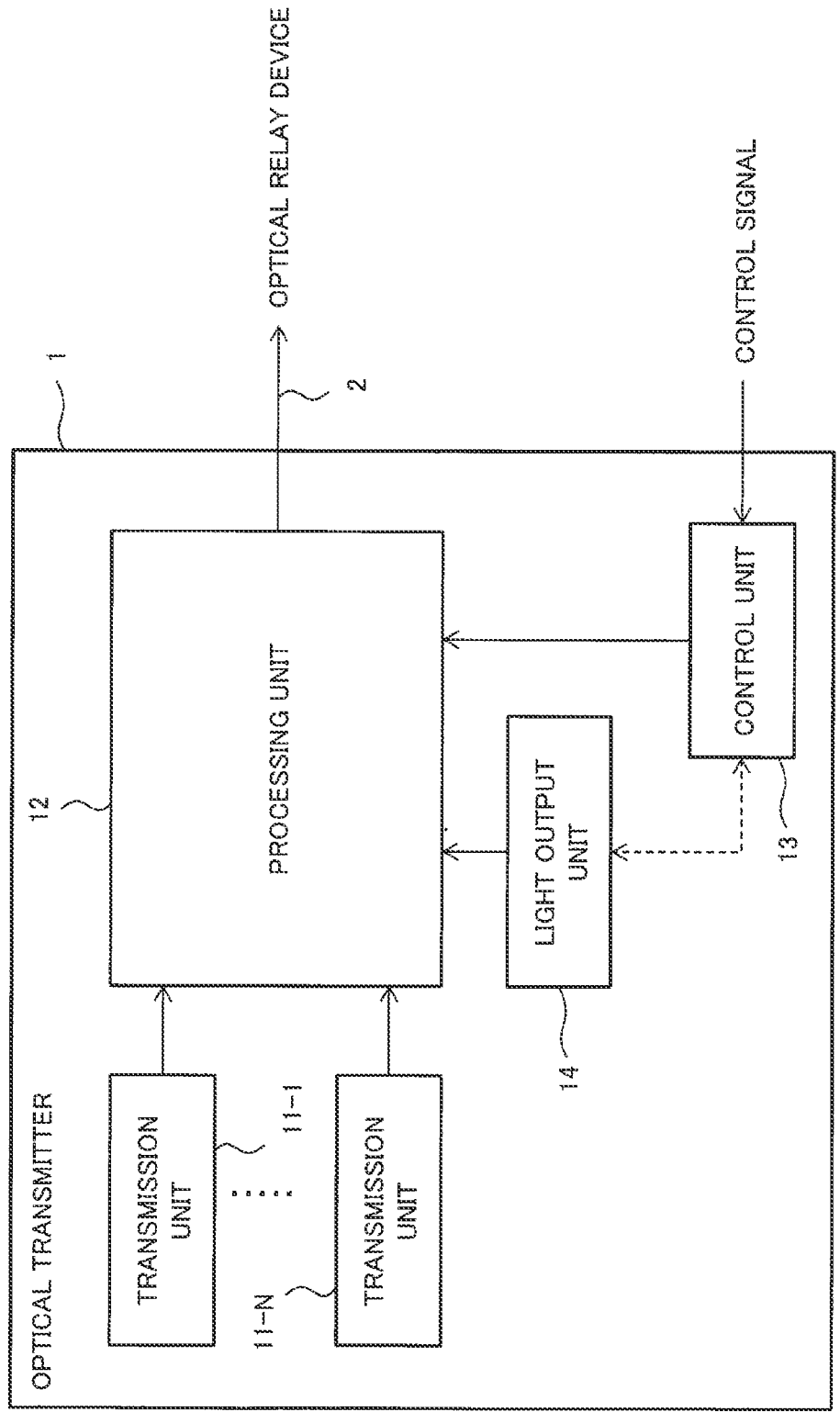
FIG. 6 is a diagram illustrating an exemplary configuration of an optical transmitter 1 according to a third exemplary embodiment of the present invention.

An exemplary configuration of an optical communication system of the third exemplary embodiment is similar to the configuration in FIG. 1. FIG. 6 is a diagram illustrating an exemplary configuration of an optical transmitter 1. The optical transmitter 1 includes a plurality of transmission units 11-1 to 11-N, a processing unit 12, a control unit 13, and a light output unit 14.

The light output unit 14 outputs dummy light for compensating for a change in the intensity of a wavelength multiplexed optical signal output from the processing unit 12 in order to keep the intensity of the wavelength multiplexed optical signal constant. In response to a request from the control unit 13, the light output unit 14 outputs dummy light having a given intensity. The light output unit 14 may be an ASE (Amplified Spontaneous Emission) light source, for example.

The dummy light output from the light output unit 14 has a wavelength other than the wavelengths of a plurality of optical signals output from the transmission units 11-1 to 11-N. In other words, the light output unit 14 outputs dummy light in a wavelength band different from the wavelength band of optical signals for data.

The control unit 13 instructs the processing unit 12 to drop an optical signal having the given wavelength in response to a bit "0" of control information. In this case, the control unit 13 requests the light output unit 14 to output dummy light in such a way as to compensate for the dropped optical signal having the given wavelength. Specifically, when the optical signal having the given wavelength has been dropped, the control unit 13 requests the light output unit 14 to output dummy light having the same intensity as the dropped optical signal having the given wavelength.

Note that the light output unit 14 may monitor the intensity of the wavelength multiplexed optical signal output from the processing unit 12 and may adjust the intensity of dummy light to output in such a way to keep the intensity of the wavelength multiplexed optical signal constant.

The processing unit 12, which is capable of adding a light wave of a desired wavelength to a plurality of optical signals output from the plurality transmission units 11, adds dummy light input from the light output unit 14 to the plurality of optical signals.

Figure 7:
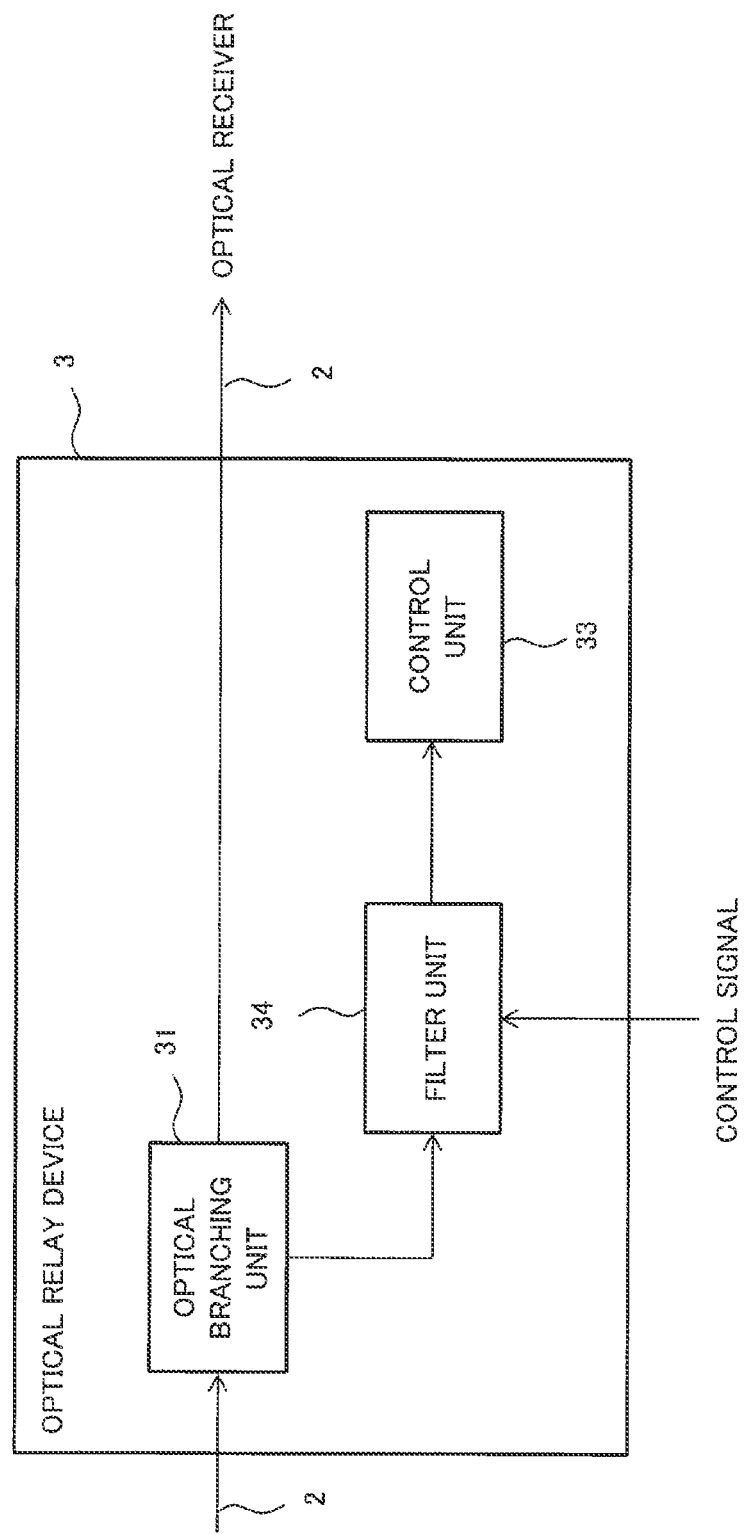
FIG. 7 is a diagram illustrating an exemplary configuration of an optical relay device 3 according to the third exemplary embodiment of the present invention.

FIG. 7 illustrates an exemplary configuration of an optical relay device 3 which receives a wavelength multiplexed optical signal output from the optical transmitter 1. As illustrated in FIG. 7, the optical relay device 3 includes an optical branching unit 31, a control unit 33, and a filter unit 34. Note that FIG. 7 illustrates an example of configuration that provides functions of extracting (detecting) control signal light contained in a wavelength multiplexed optical signal in the optical relay device 3 and is not intended to exclude other configurations.

The optical branching unit 31 separates an input wavelength multiplexed optical signal into two and outputs one wavelength multiplexed optical signal to the filter unit 34 and the other to another, external device (for example an optical receiver 4).

The filter unit 34 passes only an optical signal having a wavelength for control signal light among a plurality of optical signals included in a wavelength multiplexed optical signal, outputs the optical signal to the control unit 33, and discards the optical signals with the other wavelengths. The filter unit 34 receives a control signal that specifies a wavelength for control signal light and passes only an optical signal having the wavelength specified in the received control signal (i.e. the control signal light).

Based on the control signal light input from the filter unit 34, the control unit 33 decodes the bit pattern of the control information and controls devices (such as an optical switch and an optical relay, for example) in the optical relay device 3 based on the control information. The control unit 33 requests the optical switch and the optical relay to change an optical channel, for example, based on the control information.

Figure 8:
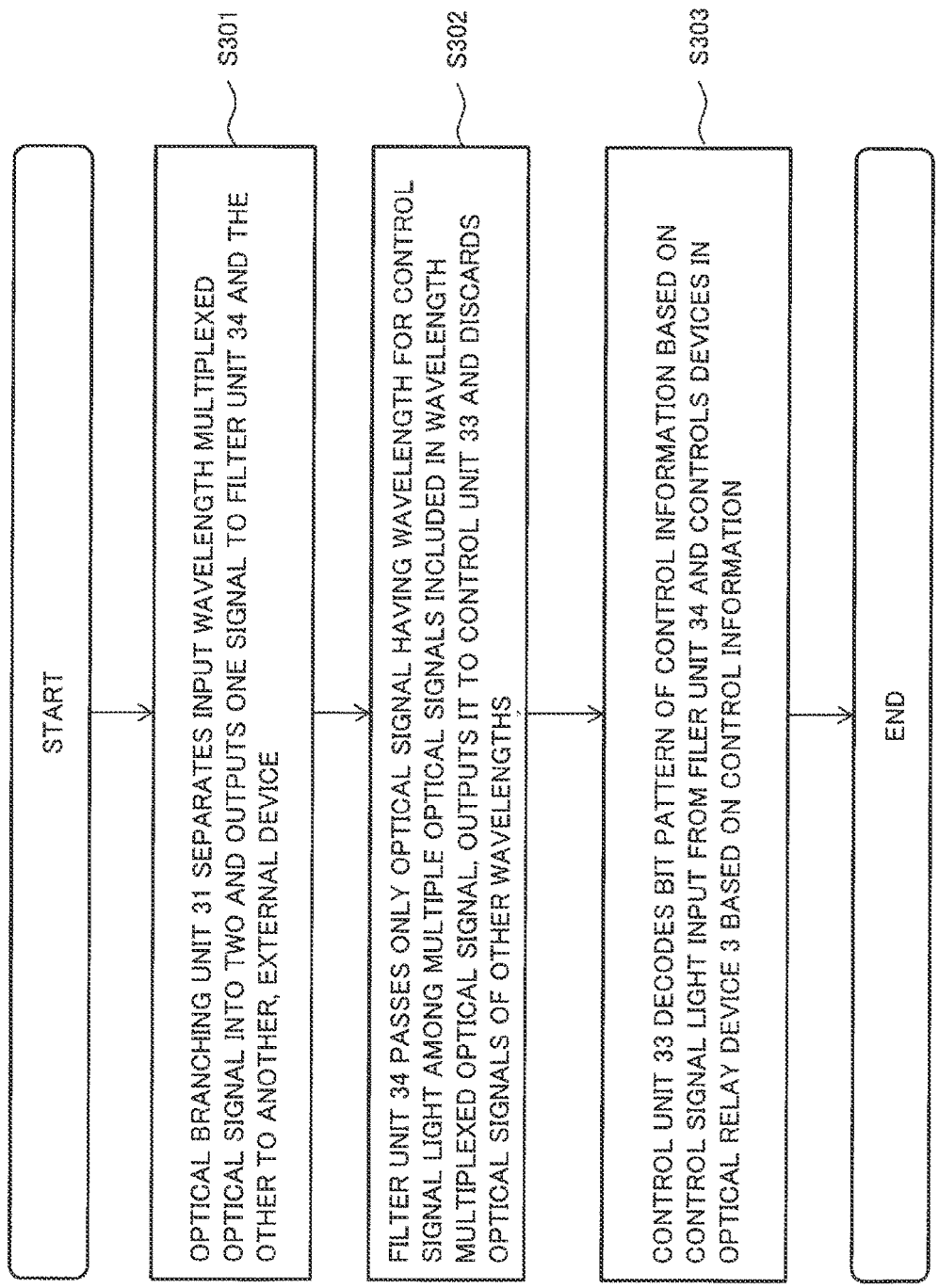
FIG. 8 is a flowchart illustrating an exemplary operation of the optical relay device 3 according to the third exemplary embodiment of the present invention.

FIG. 8 is a flowchart illustrating an exemplary operation of the optical relay device 3 which receives a wavelength multiplexed optical signal output from the optical transmitter 1. In FIG. 8, the optical branching unit 31 separates an input wavelength multiplexed optical signal into two and outputs one wavelength multiplexed optical signal to the filter unit 34 and the other to another, external device (for example an optical receiver 4) (S301).

The filter unit 34 passes only an optical signal having a wavelength for control signal light among the plurality of optical signals included in the wavelength multiplexed optical signal, outputs the optical signal having the wavelength for control signal light to the control unit 33, and discards the optical signals with the other wavelengths (S302).

Based on the control signal light input from the filter unit 34, the control unit 33 decodes the bit pattern of control information and controls devices in the optical relay device 3 based on the control information (S303).

Figure 9:
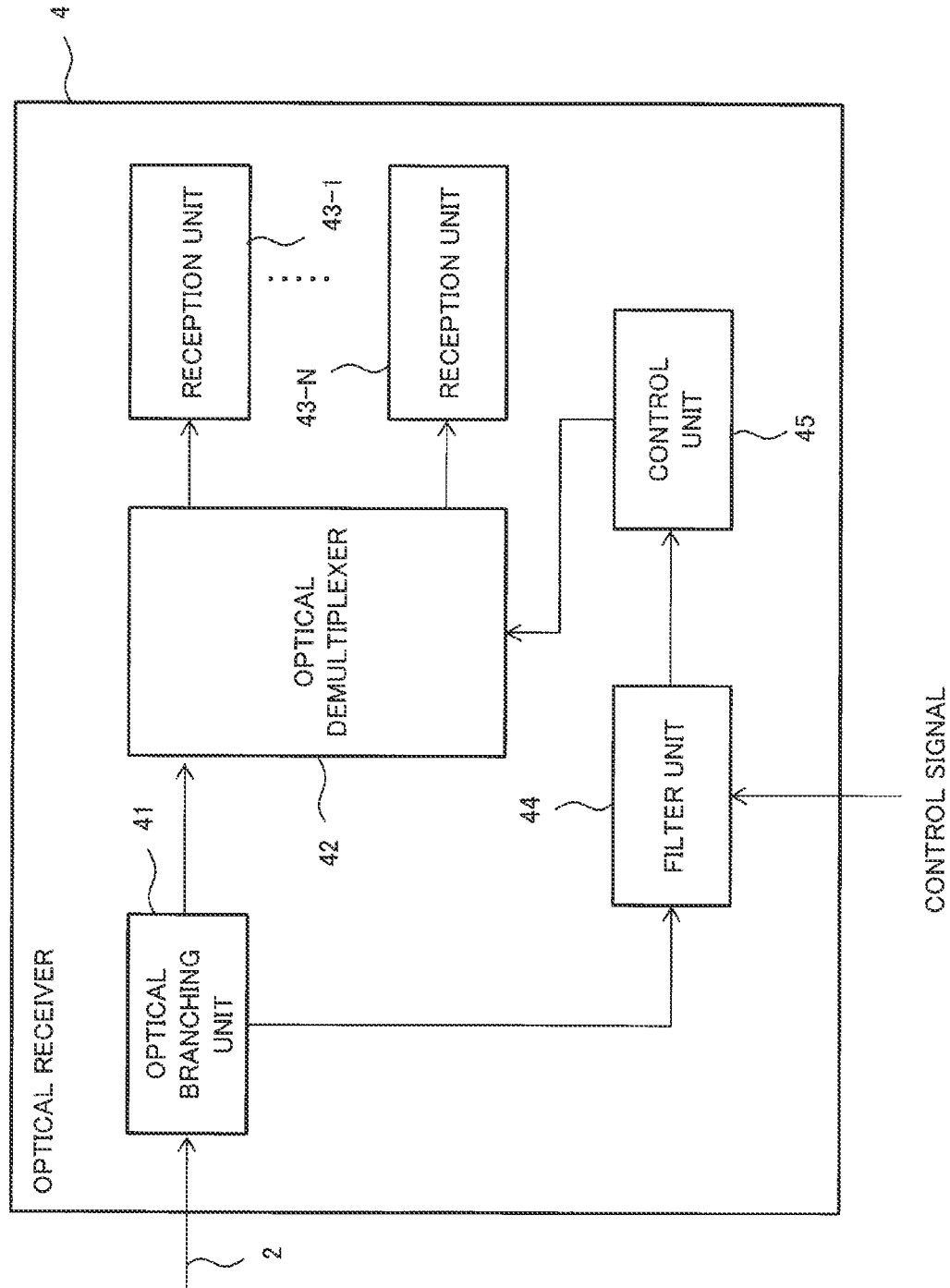
FIG. 9 is a diagram illustrating an exemplary configuration of an optical receiver 4 according to the third exemplary embodiment of the present invention.

FIG. 9 is a diagram illustrating an exemplary configuration of an optical receiver 4 which receives, through the optical relay device 3, a wavelength multiplexed optical signal output from the optical transmitter 1. As illustrated in FIG. 9, the optical receiver 4 includes an optical branching unit 41, an optical demultiplexer 42, reception units 43-1 to 43-N, a filter unit 44 and a control unit 45.

The optical branching unit 41 separates an input wavelength multiplexed optical signal into two and outputs one wavelength multiplexed optical signal to the optical demultiplexer 42 and the other to the filter unit 44.

The optical demultiplexer 42 demultiplexes an input wavelength multiplexed optical signal into a plurality of optical signal and outputs each of the optical signals to the corresponding one of the reception units 43-1 to 43-N based on a wavelength allocated to each of the reception units 43-1 to 43-N, in response to a request from the control unit 45.

Each of the reception units 43-1 to 43-N receives an optical signal having a wavelength allocated to it.

The filter unit 44 passes only an optical signal having a wavelength for control signal light among the plurality of optical signals included in an input wavelength multiplexed optical signal, outputs the optical signal having the wavelength for control signal light to the control unit 45, and discards the optical signals of the other wavelengths. The filter unit 44 receives a control signal that specifies a wavelength for control signal light from an external controller, for example, and passes only an optical signal having the wavelength specified in the received control signal (i.e. the control signal light).

The control unit 45 decodes the bit pattern of control information based on control signal light input from the filter unit 44 and controls devices in the optical receiver 4 based on the control information. The control unit 45 requests the optical demultiplexer 42, for example, to change a channel (change the wavelength allocated to each of the plurality of reception units 43) based on the control information.

Figure 10:
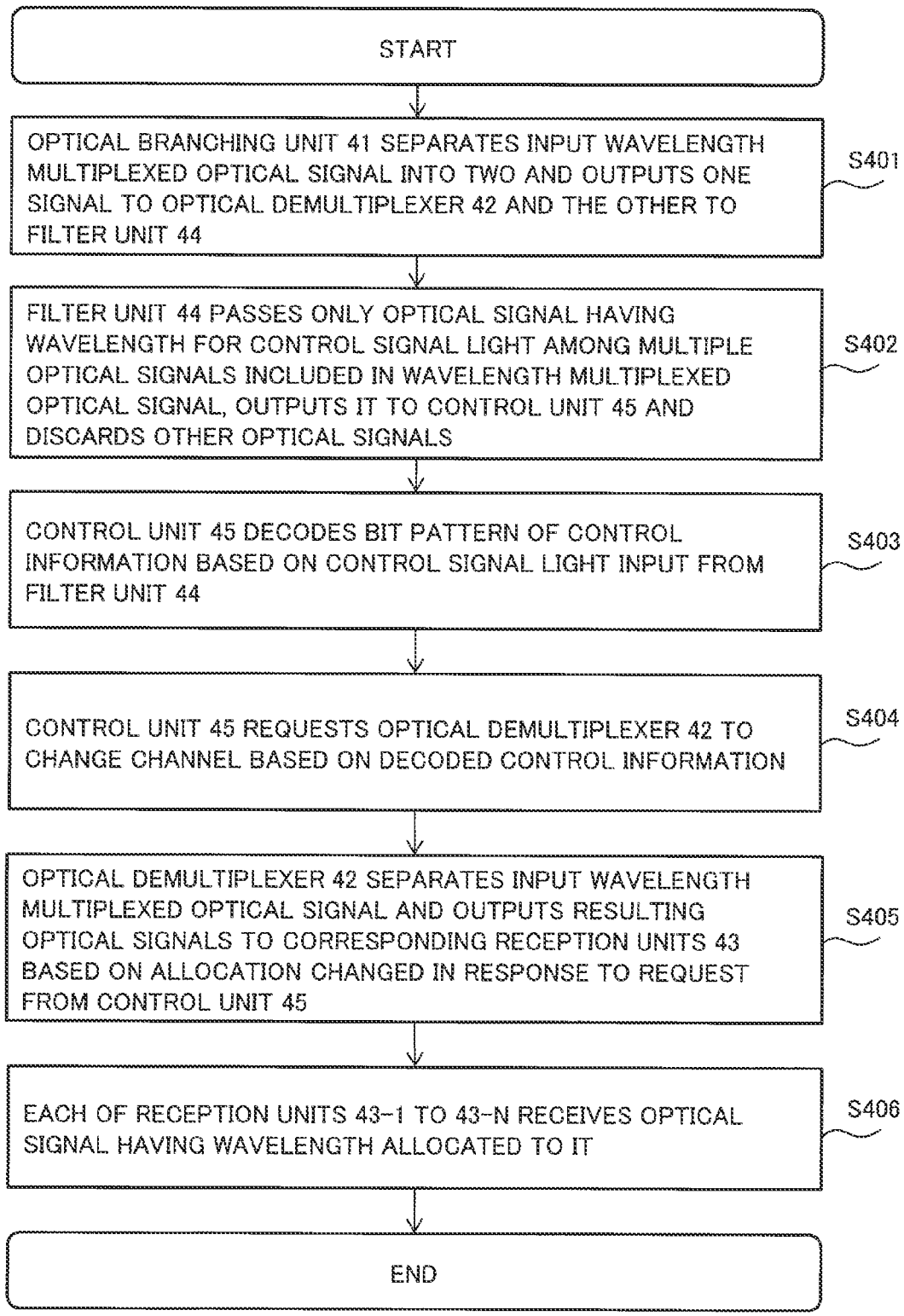
FIG. 10 is a flowchart illustrating an exemplary operation of the optical receiver 4 according to the third exemplary embodiment of the present invention.

FIG. 10 is a flowchart illustrating an exemplary operation of the optical receiver 4 which receives, through the optical relay device 3, a wavelength multiplexed optical signal output from the optical transmitter 1. Note that FIG. 10 illustrates an exemplary operation when the control unit 45 requests the optical demultiplexer 42 to change a channel (change the wavelength allocated to each of the plurality of reception units 43).

The optical branching unit 41 separates an input wavelength multiplexed optical signal into two and outputs one wavelength multiplexed optical signal to the optical demultiplexer 42 and the other to the filter unit 44 (S401).

The filter unit 44 passes only an optical signal having a wavelength for control signal light among the plurality of optical signals included in the input wavelength multiplexed optical signal, outputs the optical signal having the wavelength for control signal light to the control unit 45, and discards the optical signals with the other wavelengths (S402).

The control unit 45 decodes the bit pattern of control information based on the control signal light input from the filter unit 44 (S403). The control unit 45 requests the optical demultiplexer 42 to change a channel (change the wavelength allocated to each of the plurality of reception units 43) based on the decoded control information (S404).

The optical demultiplexer 42 demultiplexes the input wavelength multiplexed optical signal into a plurality of optical signals and outputs each of the optical signals to the corresponding one of the plurality of reception units 43 based on allocation changed in response to the request from the control unit 45 (S405).

Each of the reception units 43-1 to 43-N receives an optical signal having the wavelength allocated to it (S406).

Figure 11:
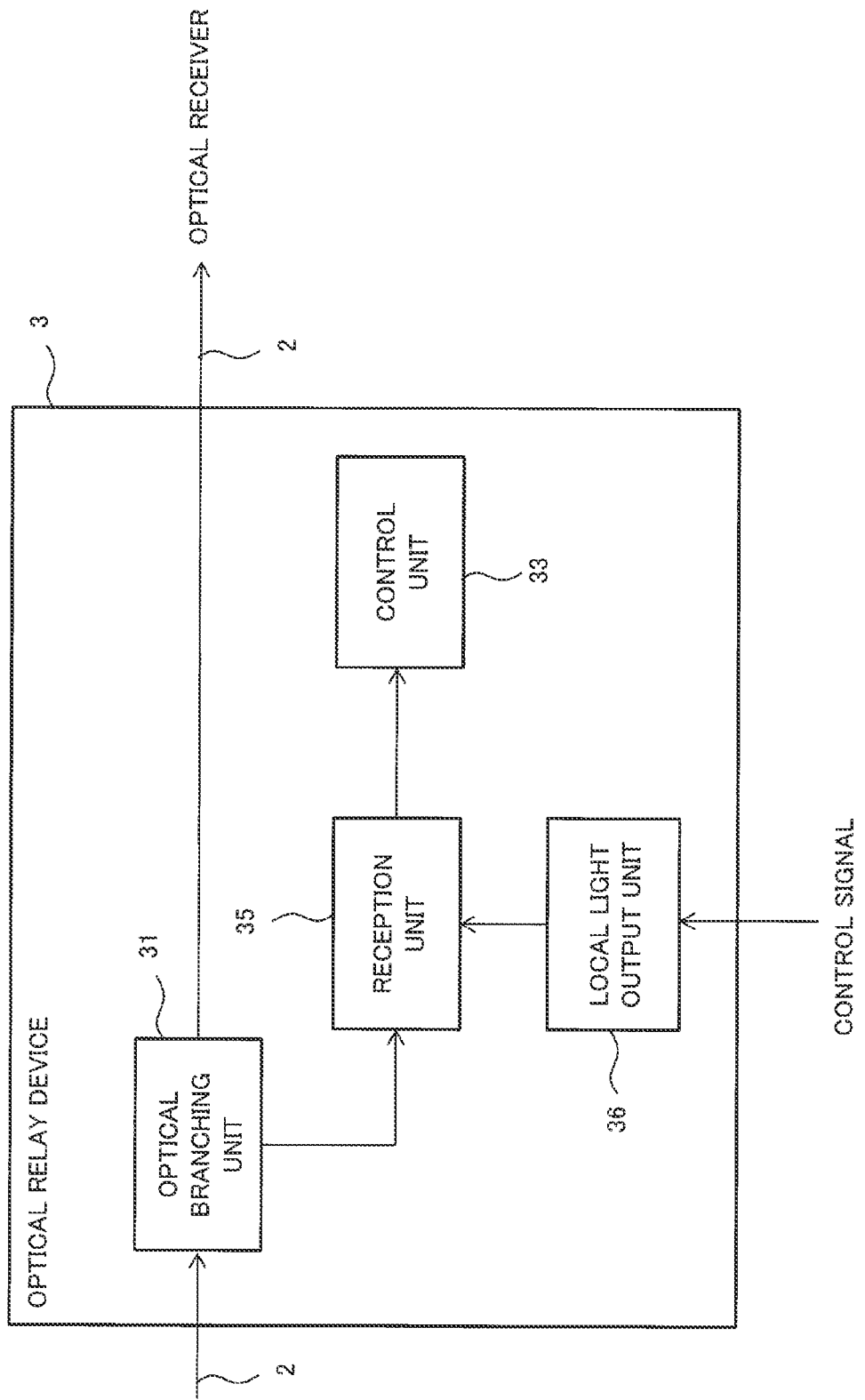
FIG. 11 is a diagram illustrating another exemplary configuration of the optical relay device 3 according to the third exemplary embodiment of the present invention.

FIG. 11 is a diagram illustrating another exemplary configuration of an optical relay device 3 which receives a wavelength multiplexed optical signal output from an optical transmitter 1. The optical relay device 3 includes an optical branching unit 31, a control unit 33, a reception unit 35 and a local light output unit 36.

The reception unit 35 causes an input wavelength multiplexed optical signal to interfere with local light of a given wavelength which is input from the local light output unit 36 and selectively receives the given wavelength from the wavelength multiplexed optical signal. The reception unit 35 outputs the optical signal having the given wavelength selectively received to the control unit 33.

The reception unit 35 is a coherent wave detector, for example, which detects a coherent wave. The coherent wave detector outputs a signal resulting from interference between a wavelength multiplexed signal input from the optical branching unit 31 and local light having a given wavelength input from the local light output unit 36 to the control unit 33. The coherent wave detector includes a 90-degree hybrid mixer (not depicted) called the coherent mixer. The coherent mixer outputs a signal resulting from interference between a wavelength multiplexed signal input from the optical branching unit 31 and local light having a given wavelength input from the local light output unit 36 (an interference signal).

The local light output unit 36 outputs local light having a given wavelength based on a received control signal. The control signal is a signal that specifies a wavelength for local light to be output from the local light output unit 36 and the specified wavelength is the wavelength for control signal light. The control signal is provided from the optical transmitter 1 or an external controller (not depicted), for example. Note that the control signal can be provided to the optical relay device 3 through a communication path (an outbound communication path) provided by a line different from the transmission path 2, for example.

The control signal may be contained in control signal light. In this case, the control signal is a signal that specifies a wavelength for local light that will be output after a lapse of a predetermined period. For example, if the wavelength of control signal light is to be changed after a lapse of a predetermined period, the optical transmitter 1 includes the control signal into the control signal light and transmits the control signal light to the optical relay device 3 in advance in order to change the wavelength of local light after the lapse of the predetermined period. The optical relay device 3 changes the wavelength of local light to the wavelength specified in the control signal after the lapse of the predetermined period specified in the control signal. By specifying a wavelength to be used after a lapse of a predetermined period via a control signal in this way, the optical relay device 3 can respond to a change of the wavelength of the control signal light if the control signal is included in the control signal light.

As described above, the reception unit 35 causes an input wavelength multiplexed optical signal to interfere with local light having a given wavelength and selectively receives the given wavelength from the wavelength multiplexed optical signal. Therefore, the local light output unit 36 is caused to output local light having a wavelength for control signal light, so that the reception unit 35 can selectively receive control signal light alone among the plurality of optical signals included in the wavelength multiplexed optical signal and can output the control signal light to the control unit 33.

Figure 12:
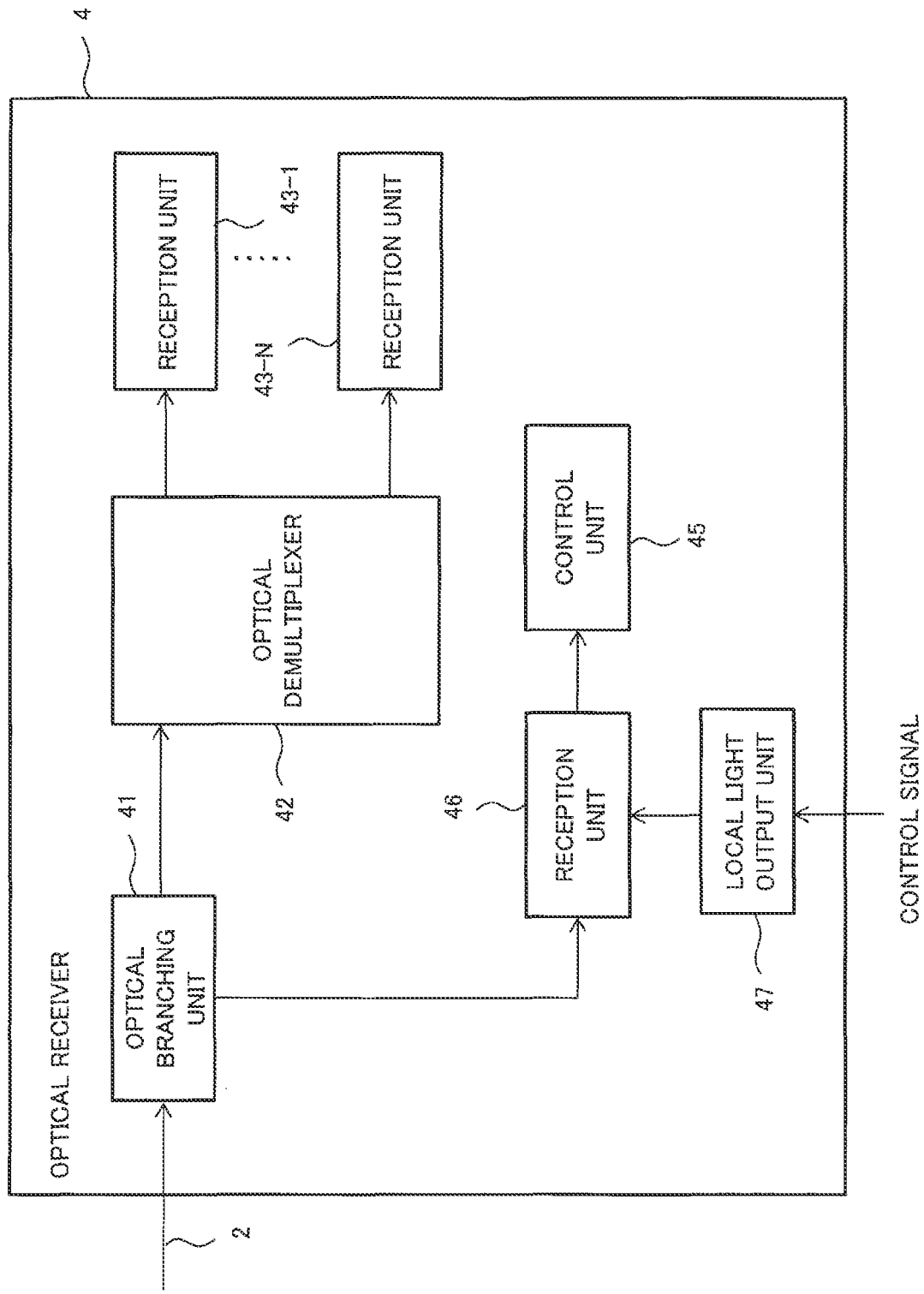
FIG. 12 is a diagram illustrating another exemplary configuration of the optical receiver 4 according to the third exemplary embodiment of the present invention.

FIG. 12 illustrates another exemplary configuration of an optical receiver 4 which receives, through the optical relay device 3, a wavelength multiplexed optical signal output from the optical transmitter 1. The optical receiver 4 includes an optical branching unit 41, an optical demultiplexer 42, reception units 43-1 to 43-N, a control unit 45, a reception unit 46 and a local light output unit 47.

The reception unit 46 causes an input wavelength multiplexed optical signal to interfere with local light having a given wavelength input from the local light output unit 47 and selectively receives the given wavelength from the wavelength multiplexed optical signal. The reception unit 46 outputs the selectively received optical signal having the given wavelength to the control unit 45. Note that like the reception unit 35 of the optical relay device 3 described above, the reception unit 46 may be a coherent wave detector, for example, which detects a coherent wave. The coherent wave detector outputs a signal resulting from interference between a wavelength multiplexed signal input from the optical branching unit 41 and local light having a given wavelength input from the local light output unit 47 to the control unit 45.

The local light output unit 47 outputs local light having a given wavelength based on a received control signal. The control signal is a signal that specifies local light having a given wavelength output from the local light output unit 47 and the given wavelength is the wavelength for control signal light. The control signal is provided from the optical transmitter 1 or an external controller (not depicted), for example. Note that the control signal can be provided to the optical receiver 4 through a communication path (an outbound communication path) provided by a line different from the transmission path 2, for example.

As described above, the reception unit 46 causes an input wavelength multiplexed optical signal to interference with local light having a given wavelength and selectively receives the given wavelength from the wavelength multiplexed optical signal. Therefore, the local light output unit 47 is caused to output local light having a wavelength for control signal light, so that the reception unit 46 can selectively receive control signal light alone among the plurality of optical signals included in the wavelength multiplexed optical signal and can output the control signal light to the control unit 45.

Fourth Exemplary Embodiment

Referring to drawings, an overview of a fourth exemplary embodiment will be provided. Note that descriptions of configurations of the fourth exemplary embodiment that are similar to those of the first to third exemplary embodiments will be omitted.

In the fourth exemplary embodiment, an optical relay device 3 includes a light output unit which compensates for an optical signal having a wavelength dropped by an optical relay device 3 using a processing unit 32 with dummy light, thereby keeping the intensity of a wavelength multiplexed optical signal output from the optical relay device 3 constant.

Figure 13:
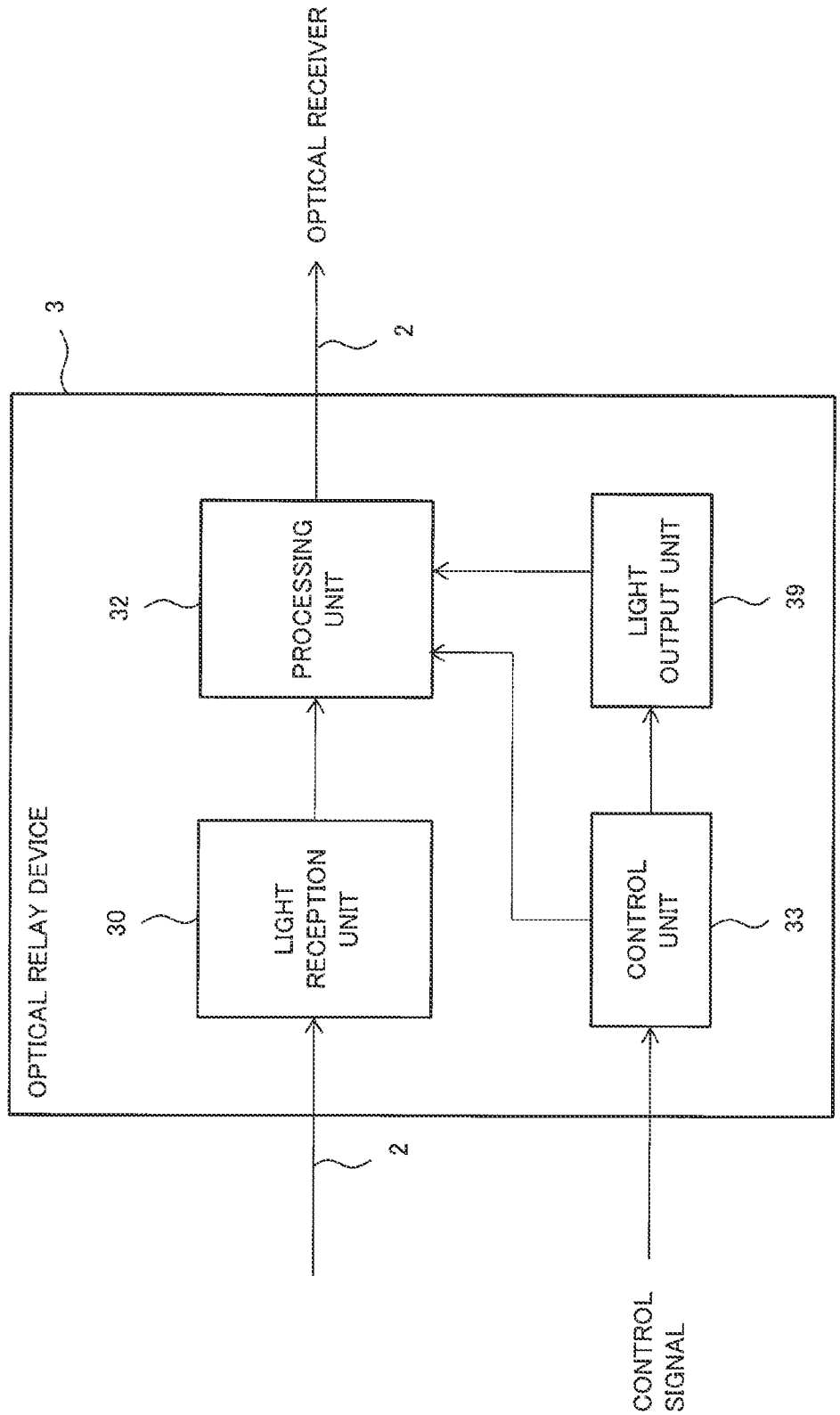
FIG. 13 is a diagram illustrating an exemplary configuration of an optical relay device 3 according to a fourth exemplary embodiment of the present invention.

FIG. 13 is a diagram illustrating an exemplary configuration of the optical relay device 3. The optical relay device 3 includes a light reception unit 30, a processing unit 32, a control unit 33 and a light output unit 39.

The light output unit 39 is an ASE light source, for example. The light output unit 39 outputs dummy light for compensating for a change in the intensity of a wavelength multiplexed optical signal output from the processing unit 32 in order to keep the intensity of the wavelength multiplexed optical signal constant. In response to a request from the control unit 33, the light output unit 39 outputs dummy light having a predetermined intensity.

The dummy light output from the light output unit 39 has a wavelength other than the wavelengths of a plurality of optical signals on which data are superimposed in a wavelength multiplexed optical signal.

In other words, the light output unit 39 outputs dummy light in a wavelength band different from the wavelength band of optical signals for data.

The control unit 33 instructs the processing unit 32 to drop an optical signal having the given wavelength in response to a bit "0" of notification information. In this case, the control unit 33 requests the light output unit 39 to output dummy light in such a way to compensate for the dropped optical signal having the given wavelength. Specifically, when the optical signal having the given wavelength has been dropped, the control unit 33 requests the light output unit 39 to output dummy light having the same intensity as the dropped optical signal having the given wavelength.

Note that the light output unit 39 may monitor the intensity of the wavelength multiplexed optical signal output from the processing unit 32 and may adjust the intensity of dummy light to output in such a way to keep the intensity of the wavelength multiplexed optical signal constant.

In response to the instruction from the control unit 33, the processing unit 32 drops an optical signal having the given wavelength from an input wavelength multiplexed optical signal and adds dummy light input from the light output unit 39 to the wavelength multiplexed optical signal from which the optical signal has been dropped.

As described above, the optical relay device 3 includes the light output unit 39 and compensates for an optical signal having a wavelength dropped using the processing unit 32 with dummy light to keep the intensity of a wavelength multiplexed optical signal output from the optical relay device 3 constant.

Fifth Exemplary Embodiment

Referring to drawings, an overview of a fifth exemplary embodiment will be provided. Note that descriptions of configurations of the fifth exemplary embodiment that are similar to those of the first to fourth exemplary embodiments will be omitted.

In the fifth exemplary embodiment, an optical relay device 3 transmits control signal light for indicating a state of the optical relay device 3 to two different optical receivers (for example, the optical receiver 4 and the optical transceiver 5 in FIG. 1).

Figure 14:
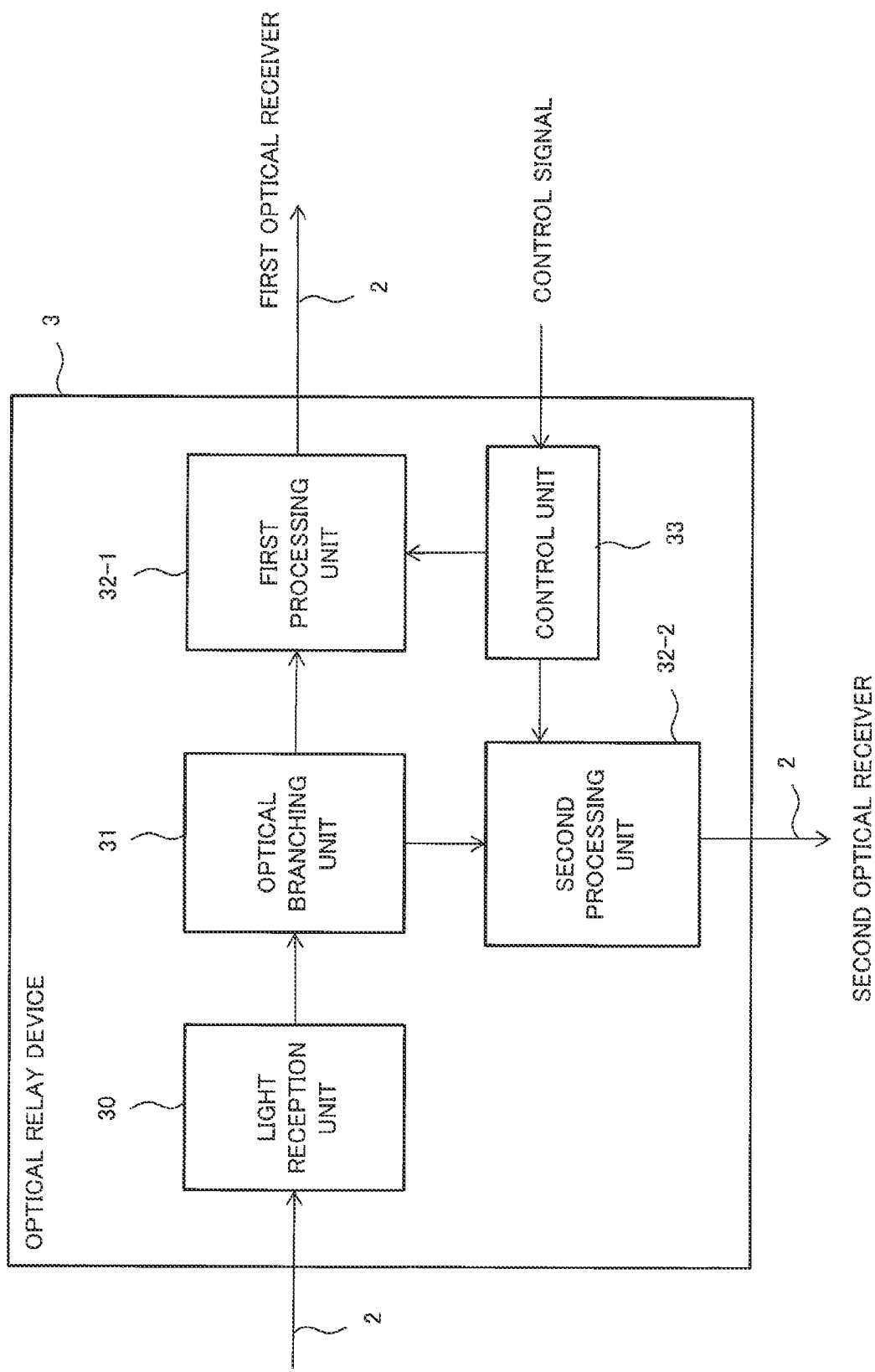
FIG. 14 is a diagram illustrating an exemplary configuration of an optical relay device 3 according to a fifth exemplary embodiment of the present invention.

FIG. 14 is a diagram illustrating an exemplary configuration of the optical relay device 3. The optical relay device 3 in the fifth exemplary embodiment includes a light reception unit 30, an optical branching unit 31, a first processing unit 32-1, a second processing unit 32-2 and a control unit 33.

The optical branching unit 31 separates a wavelength multiplexed optical signal input from the light reception unit 30 and outputs the separated signals to the first processing unit 32-1 and the second processing unit 32-2.

The first processing unit 32-1 filters (drops) parts of an optical signal having a first given wavelength included in a wavelength multiplexed optical signal directed to a first optical receiver in accordance with the bit pattern of notification information and outputs the resulting signal to the first optical receiver. Note that the first given wavelength is selected from among wavelengths that are not used as the wavelengths of optical signals for data transmitted between the optical relay device 3 and the first optical receiver.

On the other hand, the second processing unit 32-2 filters (drops) parts of an optical signal having a second given wavelength included in a wavelength multiplexed optical signal directed to a second optical receiver in accordance with the bit pattern of notification information and outputs the resulting signal to the second optical receiver. Note that the second given wavelength is selected from among wavelengths that are not used as the wavelengths of optical signals for data transmitted between the optical relay device 3 and the second optical receiver.

The control unit 33 specifies the first given wavelength used as control signal light and instructs the first processing unit 32-1 to filter an optical signal having the first given wavelength in accordance with the bit pattern of first notification information. Note that the first notification information is information indicating a state of the optical relay device 3 to the first optical receiver.

On the other hand, the control unit 33 specifies the second given wavelength used as control signal light and instructs the second processing unit 32-2 to filter an optical signal having the second given wavelength in accordance with the bit pattern of second notification information. Note that the second notification information is information indicating a state of the optical relay device 3 to the second optical receiver.

As describe above, the optical relay device 3 in the fifth exemplary embodiment includes two processing units 32-1, 32-2. The two processing units 32-1, 32-2 transmit wavelength multiplexed optical signals including control signal light to two different optical receivers (for example, the optical receiver 4 and the optical transceiver 5 in FIG. 1). The optical relay device 3 thus can indicate a state of the optical relay device 3 to the two different optical receivers.

Note that the optical relay device 3 does not necessarily need to include two processing units 32 but instead may include any number of processing units 32. In this case, the optical relay device 3 can transmit wavelength multiplexed optical signals including control signal light to as many optical receivers as the number of processing units 32 to indicate a state of the optical relay device 3 to the optical receivers.

Sixth Exemplary Embodiment

Referring to drawings, an overview of a sixth exemplary embodiment will be provided. Note that descriptions of configurations of the sixth exemplary embodiment that are similar to those of the first to fifth exemplary embodiments will be omitted.

In the sixth exemplary embodiment, a wavelength multiplexed optical signal output from an optical transmitter 1 includes at least one beam of first control signal light, and a wavelength multiplexed optical signal output from an optical relay device 3 includes at least one beam of second control signal light. The first control signal light contains control information for the optical relay device 3. The second control signal light, on the other hand, contains notification information for the optical relay device 3 to indicate a state (for example a failure state) of the optical relay device 3 to an optical receiver 4 or an optical transceiver 5.

Figure 15:
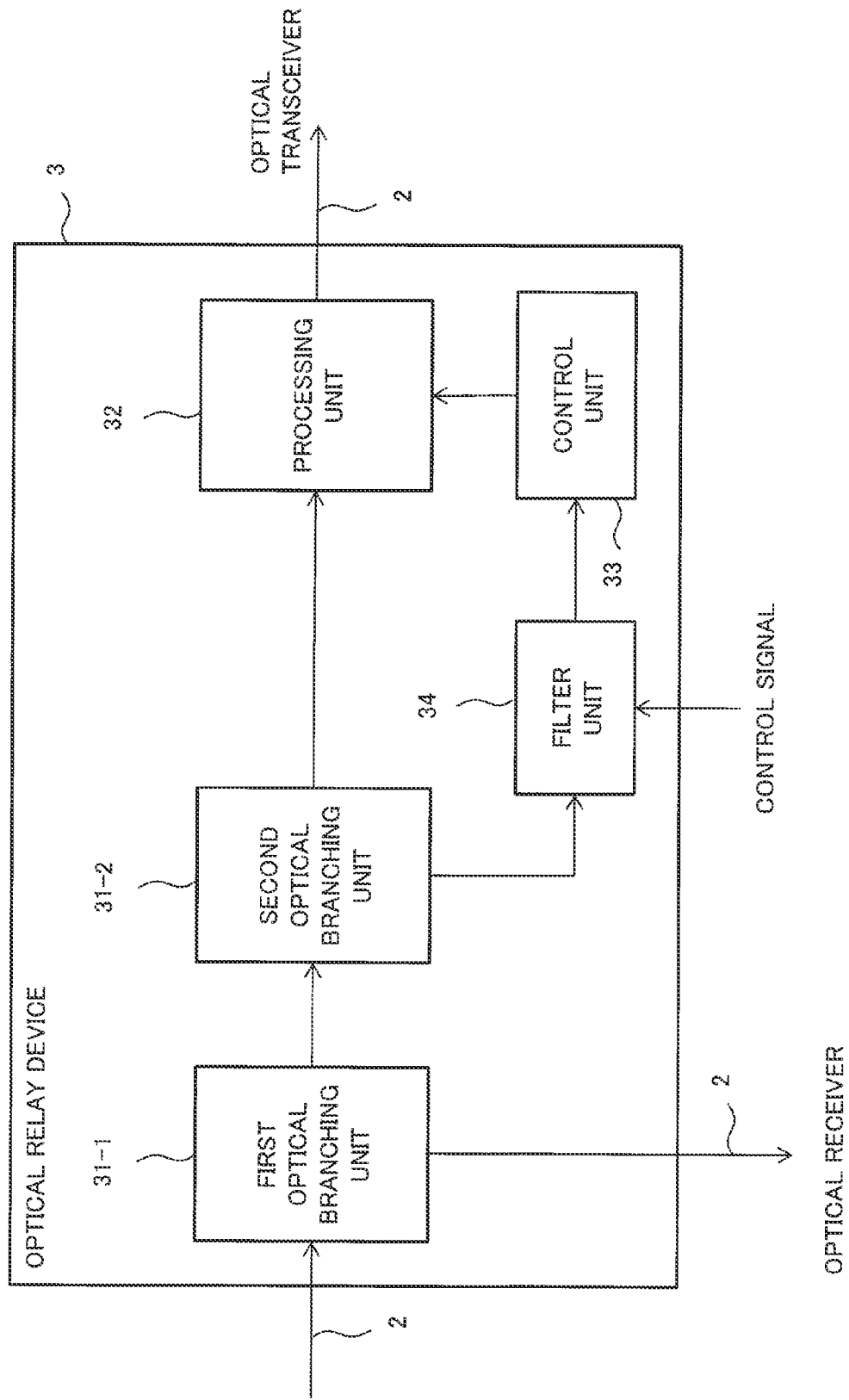
FIG. 15 is a diagram illustrating an exemplary configuration of an optical relay device 3 according to a sixth exemplary embodiment of the present invention.

An exemplary configuration of the optical communication system according to the sixth exemplary embodiment is similar to the configuration in FIG. 1. FIG. 15 is a diagram illustrating an exemplary configuration of the optical relay device 3 according to the sixth exemplary embodiment. The optical relay device 3 according to the sixth exemplary embodiment includes a first optical branching unit 31-1, a second optical branching unit 31-2, a processing unit 32, a control unit 33 and a filter unit 34.

The first optical branching unit 31-1 separates a wavelength multiplexed optical signal input from the optical transmitter 1 through a transmission path 2 into two and outputs one wavelength multiplexed optical signal to the second optical branching unit 31-2 and the other to another, external device (for example the optical transceiver 5).

The second optical branching unit 31-2 separates an input wavelength multiplexed optical signal into two and outputs one wavelength multiplexed optical signal to the processing unit 32 and the other to the filter unit 34.

The filter unit 34 receives a control signal that specifies a wavelength for the first control signal light. The filter unit 34 passes only an optical signal having the wavelength specified in the received control signal (i.e. the first control signal light) among the plurality of optical signals included in an input wavelength multiplexed optical signal and outputs the optical signal having the specified wavelength to the control unit 33.

The control unit 33 generates notification information for indicating a state (such as a failure state, for example) of the optical relay device 3. In order to generate the notification information, the control unit 33 collects information such as a failure state from devices included in the optical relay device 3. The wavelength of the second control signal light for the optical relay device 3 to indicate its state is indicated by the optical transmitter 1 using the first control signal light input from the filter unit 34. The control unit 33 therefore determines the wavelength of the second control signal light based on the first control signal.

The control unit 33 instructs the processing unit 32 to filter light power of parts of the second control signal light having the given wavelength in accordance with the bit pattern of the generated notification information. As in the first to third exemplary embodiments, the optical signal having the given wavelength used as the second control signal light is an optical signal that is not used as an optical signal for data.

In response to the instruction from the control unit 33, the processing unit 32 selects an optical signal having a given wavelength from the wavelength multiplexed optical signal input from the second optical branching unit 31-2 and filters light power of the selected optical signal in accordance with the bit pattern of the notification information. Specifically, the processing unit 32 turns on and off (drops and does not drop) the output of the selected optical signal. The processing unit 32 then outputs the wavelength multiplexed optical signal including the optical signal having the given wavelength parts of which have been dropped (or have not been dropped) in accordance with the bit pattern of the notification information (i.e. the second control signal light) to the transmission path 2.

Figure 16:
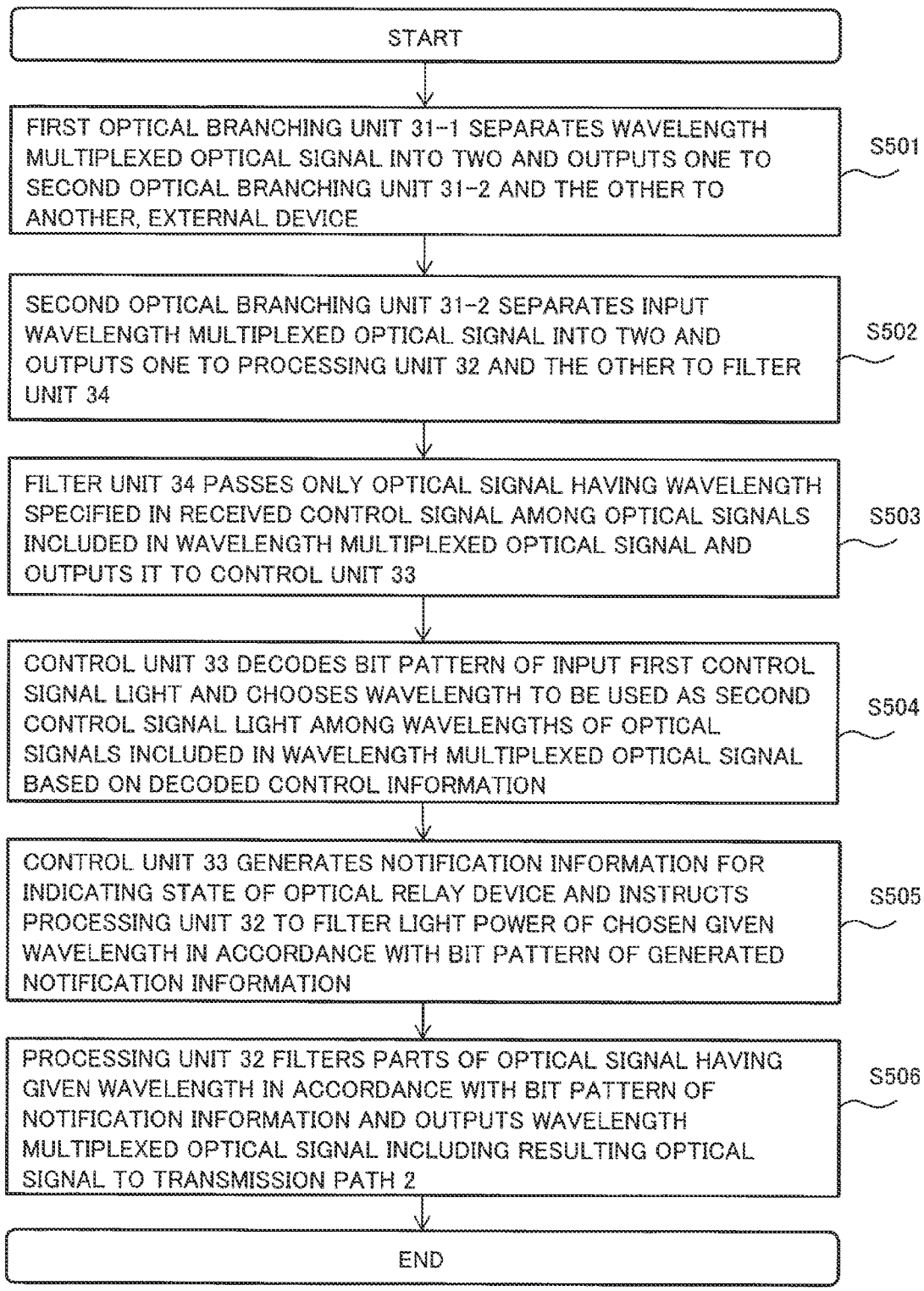
FIG. 16 is a flowchart illustrating an exemplary operation of the optical relay device 3 according to the sixth exemplary embodiment of the present invention.

FIG. 16 is a flowchart illustrating an exemplary operation of the optical relay device 3 according to the sixth exemplary embodiment of the present invention. In FIG. 16, the first optical branching unit 31-1 separates a wavelength multiplexed optical signal input through the transmission path 2 into two and outputs one wavelength multiplexed optical signal to the second optical branching unit 31-2 and the other to another external device (for example the optical transceiver 5) (S501).

The second optical branching unit 31-2 separates the input wavelength multiplexed optical signal into two and outputs one wavelength multiplexed optical signal to the processing unit 32 and the other to the filter unit 34 (S502).

The filter unit 34 receives a control signal that specifies a wavelength for first control signal light. The filter unit 34 then passes only an optical signal having the wavelength specified in the received control signal (i.e. first control signal light) among the plurality of optical signals included in the wavelength multiplexed optical signal and outputs the optical signal having the specified wavelength to the control unit 33 (S503).

The control unit 33 decodes the bit pattern of the input first control signal light and chooses a given wavelength to be used as second control signal light from among the wavelengths of the plurality of optical signals included in the wavelength multiplexed optical signal based on the decoded control information (S504).

The control unit 33 generates notification information for indicating a state (for example a failure state) of the optical relay device 3 and instructs the processing unit 32 to filter light power of the chosen given wavelength in accordance with the bit pattern of the generated notification information (S505).

The processing unit 32 outputs to the transmission path 2 a wavelength multiplexed optical signal including an optical signal (second control signal light) having the given wavelength parts of which have been filtered (dropped) in accordance with the bit pattern of the notification information (S506).

Figure 17:
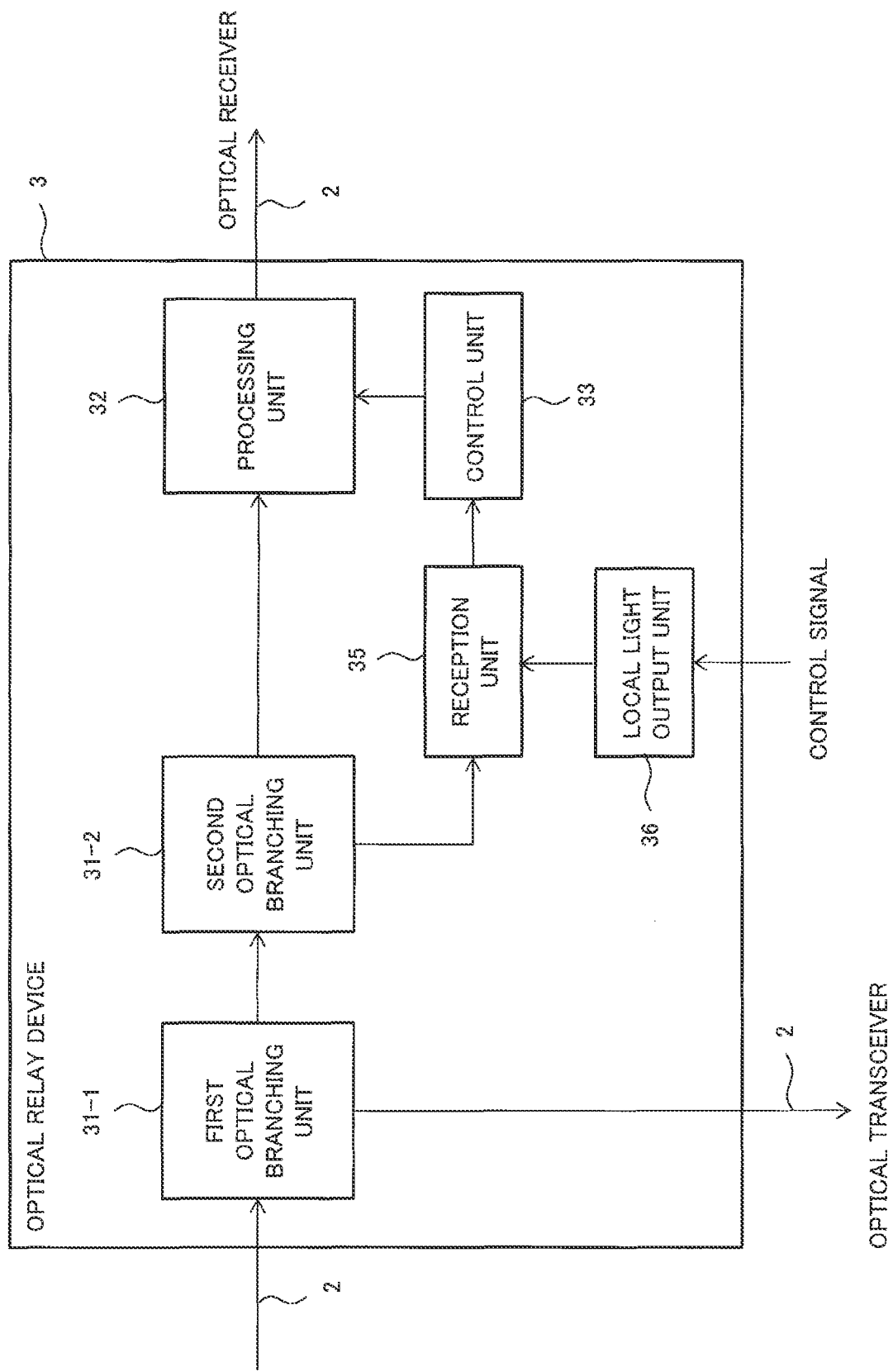
FIG. 17 is a diagram illustrating another exemplary configuration of the optical relay device 3 according to the sixth exemplary embodiment of the present invention.

FIG. 17 is a diagram illustrating another exemplary configuration of an optical relay device 3 according to the sixth exemplary embodiment. As illustrated in FIG. 17, the optical relay device 3 includes a first optical branching unit 31-1, a second optical branching unit 31-2, a processing unit 32, a control unit 33, a reception unit 35 and a local light output unit 36.

The reception unit 35 causes an input wavelength multiplexed optical signal to interfere with local light of a given wavelength input from the local light output unit 36 and selectively receives the given wavelength from the wavelength multiplexed optical signal. The reception unit 35 outputs the optical signal having the selectively received given wavelength to the control unit 33. Therefore, the local light output unit 36 is caused to output local light having a wavelength of first control signal light, so that the reception unit 35 can selectively receive only the first control signal light including control information among the plurality of optical signals included in the wavelength multiplexed optical signal and can output the first control signal light to the control unit 33.

As described above, the optical relay device 3 according to the sixth exemplary embodiment chooses a wavelength specified in control information contained in the first control signal light from the optical transmitter 1 as the wavelength of the second control signal light which contains notification information. Thus, in the optical communication system according to the sixth exemplary embodiment, the optical transmitter 1 can specify the second control signal light to be output from the optical relay device 3.

Seventh Exemplary Embodiment

Referring to drawings, an overview of a seventh exemplary embodiment will be provided. Note that descriptions of configurations of the seventh exemplary embodiment that are similar to those of the first to sixth exemplary embodiments will be omitted.

Figure 18:
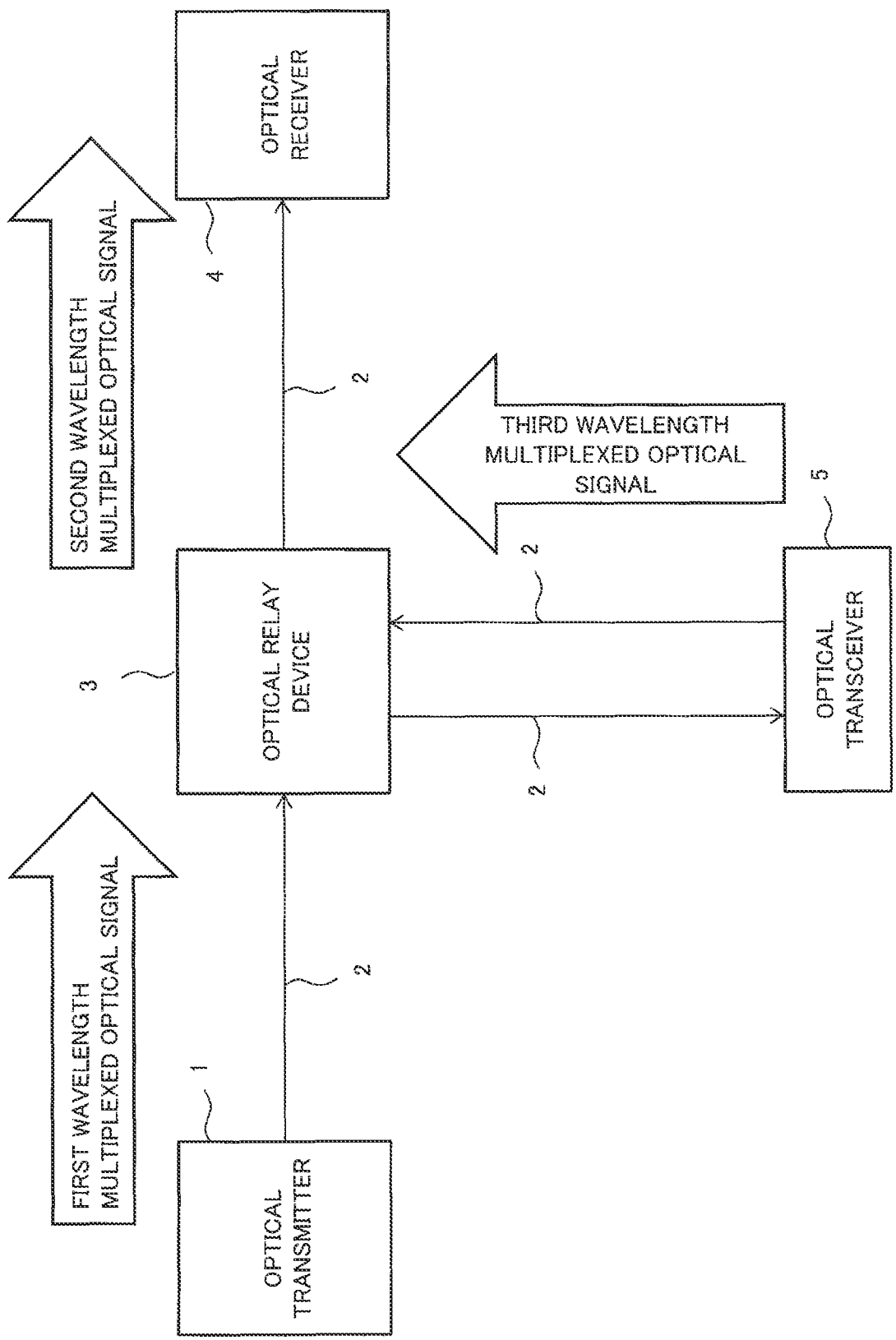
FIG. 18 is a diagram illustrating an exemplary configuration of an optical communication system according to a seventh exemplary embodiment of the present invention.

FIG. 18 is a diagram illustrating an exemplary configuration of an optical communication system according to the seventh exemplary embodiment. In the optical communication system according to the seventh exemplary embodiment, a first wavelength multiplexed optical signal output from an optical transmitter 1 includes first control signal light. The first control signal light is an optical signal containing first control information for the optical transmitter 1 to control an optical relay device 3.

A second wavelength multiplexed optical signal output from the optical relay device 3 contains second control signal light. The second control signal light is an optical signal containing notification information for the optical relay device 3 to indicate its state (such as a failure state, for example).

A third wavelength multiplexed optical signal output from an optical transceiver 5 includes third control signal light. The third control signal light is an optical signal containing second control information for the optical transceiver 5 to control the optical relay device 3.

Figure 19:
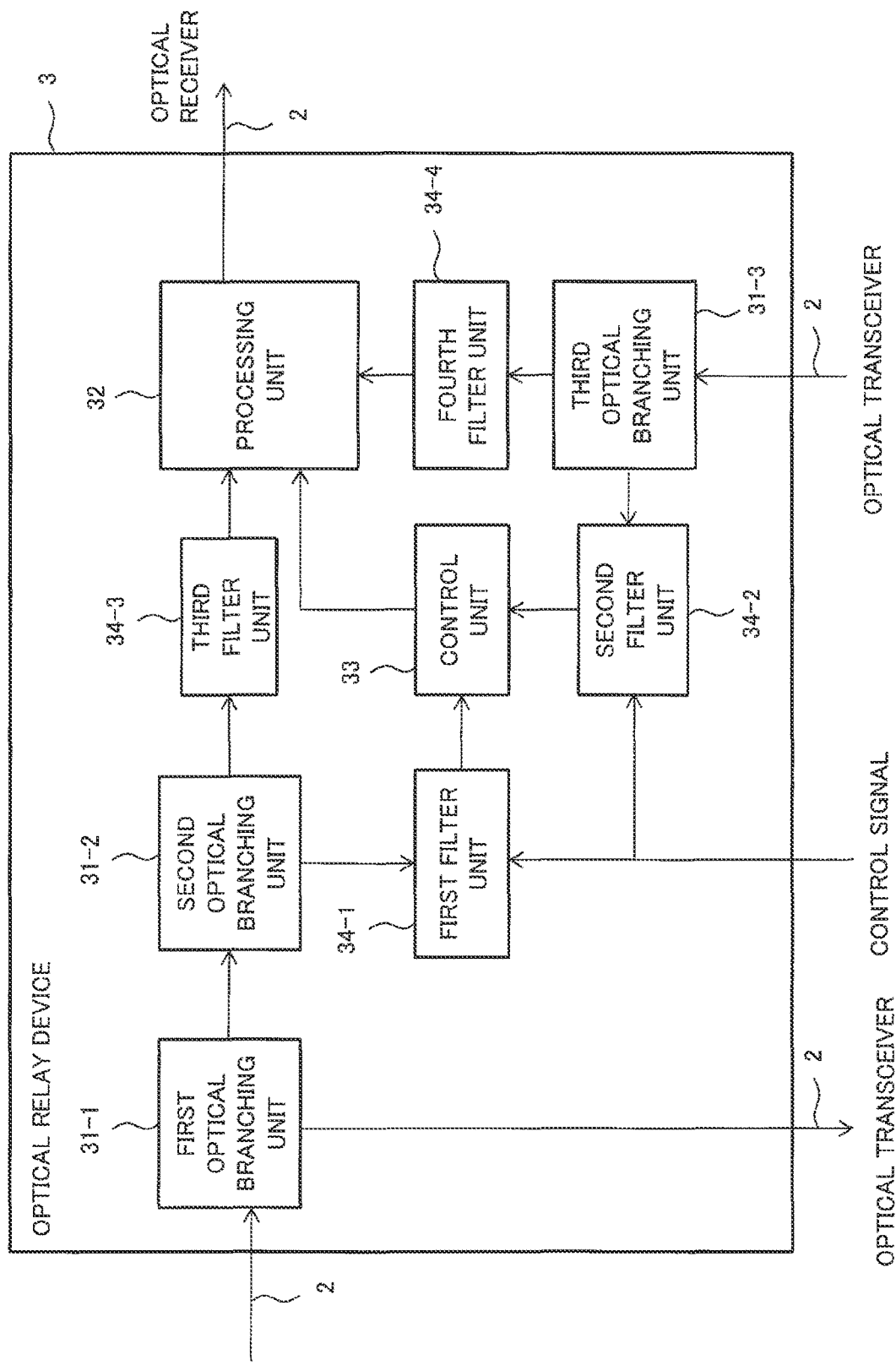
FIG. 19 is a diagram illustrating an exemplary configuration of an optical relay device 3 according to the seventh exemplary embodiment of the present invention.

FIG. 19 is a diagram illustrating an exemplary configuration of the optical relay device 3 according to the seventh exemplary embodiment. The optical relay device 3 includes a first optical branching unit 31-1, a second optical branching unit 31-2, a third optical branching unit 31-3, a processing unit 32, a control unit 33, and first to fourth filter units 34-1 to 34-4.

The second optical branching unit 31-2 separates a first wavelength multiplexed optical signal input from the first optical branching unit 31-1 and outputs one first wavelength multiplexed optical signal to the first filter unit 34-1 and the other to the third filter unit 34-3.

In response to a control signal, the first filter unit 34-1 passes only first control signal light contained in the first wavelength multiplexed optical signal output from the optical transmitter 1 and outputs the first control signal light to the control unit 33.

The third filter unit 34-3 passes only an optical signal directed to an optical receiver 4 among the optical signals included in the first wavelength multiplexed optical signal input from the optical transmitter 1 and outputs it to the processing unit 32.

The third optical branching unit 31-3 separates a third wavelength multiplexed optical signal input from an optical transceiver 5 and outputs one of the third wavelength multiplexed optical signal to the second filter unit 34-2 and the other to the fourth filter unit 34-4.

The second filter unit 34-2 passes only third control signal light contained in the third wavelength multiplexed optical signal input from the optical transceiver 5 and outputs it to the control unit 33 in response to the control signal.

The fourth filter unit 34-4 passes only an optical signal directed to the optical receiver 4 among the optical signals included in the third wavelength multiplexed optical signal input from the optical transceiver 5 and outputs it to the processing unit 32.

The control unit 33 decodes the bit pattern of the first control information from the input first control signal light and controls devices in the optical relay device 3 based on the decoded first control information. Similarly, the control unit 33 decodes the bit pattern of the second control information from the input third control signal light and controls devices in the optical relay device 3 based on the decoded second control information.

Further, the control unit 33 generates notification information for indicating a state (such as a failure state, for example) of the optical relay device 3. To generate the notification information, the control unit 33 collects information such as a failure state from devices included in the optical relay device 3.

In the seventh exemplary embodiment, the wavelength of the second control signal light for the optical relay device 3 to indicate its state is indicated by the first control signal light from the optical transmitter 1. The control unit 33 therefore determines a wavelength for the second control signal light based on the first control information decoded from the first control signal light. Note that the wavelength of the second control signal light may be indicated from the optical transceiver 5. In that case, the control unit 33 determines the wavelength of the second control signal light based on the second control information decoded from the third control signal light contained in the third wavelength multiplexed optical signal received from the optical transceiver 5.

Based on the first control information decoded from the first control signal light, the control unit 33 determines the wavelength for the second control signal light. The control unit 33 then instructs the processing unit 32 to drop parts of an optical signal having the determined given wavelength in accordance with the bit pattern of the generated notification information. As in the first to third exemplary embodiments, the optical signal having the given wavelength used as the second control signal light is an optical signal that is not used as an optical signal for data.

The processing unit 32 multiplexes the wavelength multiplexed optical signal input from the third filter unit 34-3, the wavelength multiplexed optical signal input from the fourth filter unit 34-4, and the second control signal light having the given wavelength, parts of the second control signal light been dropped based on the bit pattern of the notification information in response to the instruction from the control unit 33, together and outputs the resulting signal to the transmission path 2.

As described above, the optical relay device 3 controls the devices in the optical relay device 3 based not only on the first control information decoded from the first control signal light from the optical transmitter 1 but also on the second control information decoded from the third control signal light from the optical transceiver 5. In this way, in the optical communication system according to the seventh exemplary embodiment, the devices in the optical relay device 3 can be controlled not only from the optical transmitter 1 but also from the optical transceiver 5.

Eighth Exemplary Embodiment

Referring to drawings, an overview of an eighth exemplary embodiment will be provided. Note that descriptions of configurations of the eighth exemplary embodiment that are similar to those of the first to seventh exemplary embodiments will be omitted.

Figure 20:
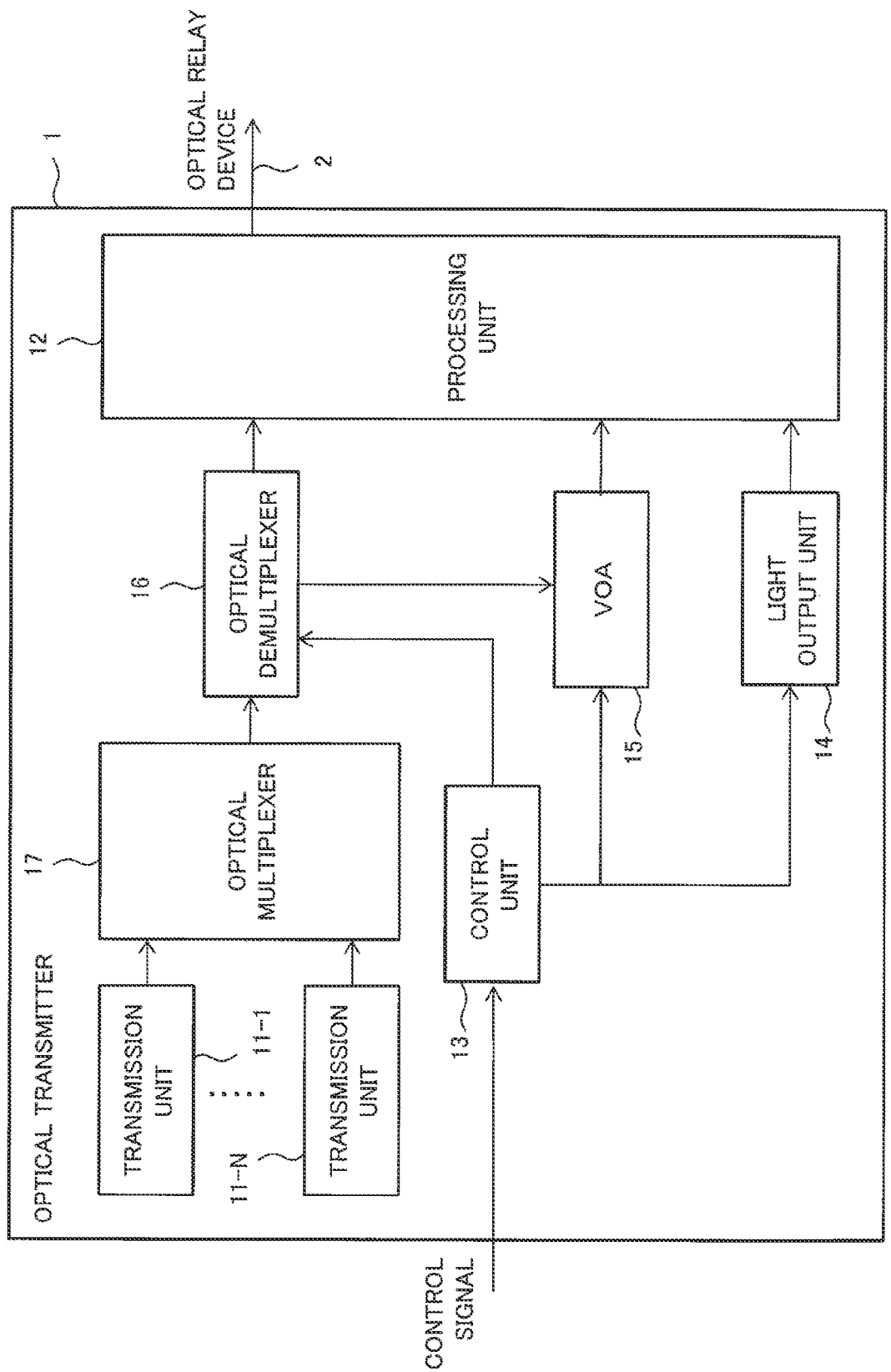
FIG. 20 is a diagram illustrating an exemplary configuration of an optical transmitter 1 according to an eighth exemplary embodiment of the present invention.

An exemplary configuration of an optical communication system according to the eighth exemplary embodiment is similar to the configuration in FIG. 1. FIG. 20 is a diagram illustrating an exemplary configuration of an optical transmitter 1 in the eighth exemplary embodiment. The optical transmitter 1 includes a plurality of transmission units 11-1 to 11-N, an optical multiplexer 17, a processing unit 12, a control unit 13, and a light output unit 14. The optical transmitter 1 further includes a variable optical attenuator (VOA) 15 and an optical demultiplexer 16.

The VOA 15 changes the intensity of an input optical signal having a given wavelength in response to a request from the control unit 13. The VOA 15 may be a variable optical attenuator descried in Japanese Patent Publication No. 5065333. The variable optical attenuator is capable of attenuating the intensity of signal light traveling through an optical fiber to an arbitrary level. The variable optical attenuator is capable of changing the intensity of an output optical signal by changing the level of voltage applied. Note that the variable optical attenuator is capable of changing the intensity of the output optical signal on a per microsecond basis.

The VOA 15 attenuates the intensity of an optical signal having a given wavelength to "0" when a bit of control information for the optical signal having the given wavelength is "0" (while bits of the control information are "0"). On the other hand, when the bit of the control information is "1" (while the bits of the control information are "1"), the VOA 15 does not attenuate the intensity of the optical signal having the given wavelength. In other words, when a bit of the control information is "0", the optical signal having the given wavelength is not included in the wavelength multiplexed optical signal (the intensity is "0"); when a bit of the control information is "1", the optical signal having the given wavelength is included in the wavelength multiplexed optical signal. Therefore, a device that receives the wavelength multiplexed optical signal (for example an optical relay device 3) can decode the bit pattern of the control information by detecting the given wavelength included in the wavelength multiplexed optical signal.

The control unit 13 requests the optical demultiplexer 16 to separate the optical signal having the given wavelength to be used as control signal light from the plurality of wavelengths included in the wavelength multiplexed optical signal and input the separated optical signal into the VOA 15.

Further, the control unit 13 instructs the VOA 15 to attenuate (or not to attenuate) the optical signal having the given wavelength in accordance with the bit pattern of control information for controlling the optical relay device 3.

Moreover, when the control unit 13 instructs the VOA 15 to attenuate the optical signal having the given wavelength to be used as control signal light, the control unit 13 requests the light output unit 14 to compensate for the attenuation of the optical signal having the given wavelength.

In response to the request from the control unit 13, the optical demultiplexer 16 separates the optical signal having the given wavelength specified by the control unit 13 and inputs the separated optical signal into the VOA 15. The optical demultiplexer 16 outputs the optical signals included in the wavelength multiplexed optical signal other than the optical signal input into the VOA 15 to the processing unit 12.

The processing unit 12 adds the optical signal having the given wavelength input from the VOA 15 and dummy light input from the light output unit 14 to the optical signals input from the optical demultiplexer 16 and outputs the resulting optical signal through a transmission path 2.

Figure 21:
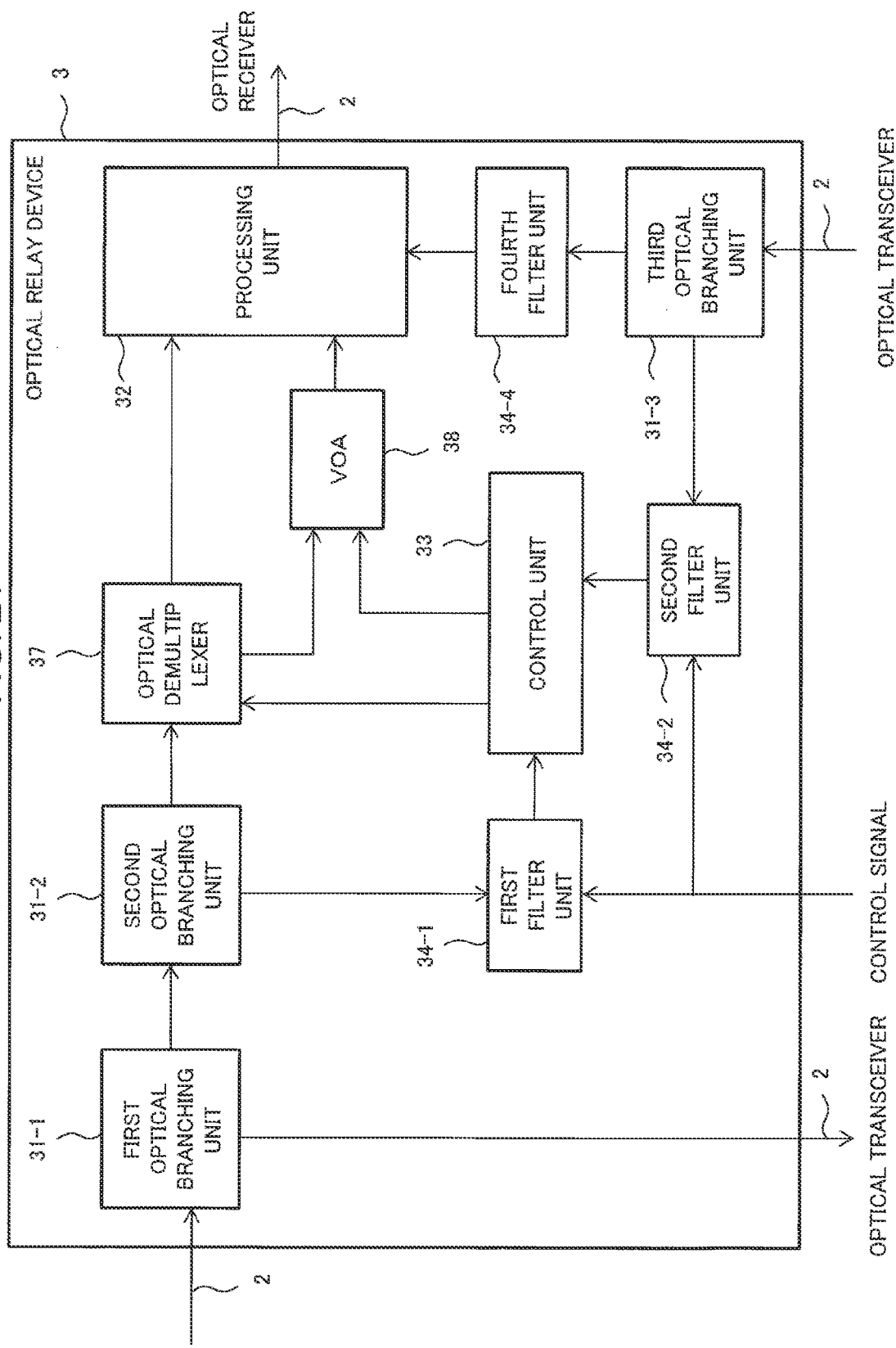
FIG. 21 is a diagram illustrating an exemplary configuration of an optical relay device 3 according to the eighth exemplary embodiment of the present invention.

The VOA 15 described above is applicable to an optical relay device 3 as well. FIG. 21 is a diagram illustrating an exemplary configuration of an optical relay device 3 according to the eighth exemplary embodiment. The optical relay device 3 includes a first optical branching unit 31-1, a second optical branching unit 31-2, a third optical branching unit 31-3, a processing unit 32, a control unit 33, a first filter unit 34-1, a second filter unit 34-2, and a fourth filter unit

34-4. In addition, the optical relay device 3 includes an optical demultiplexer 37 and a VOA 38.

The VOA 38 changes the intensity of an input optical signal having a given wavelength in response to a request from the control unit 33. Note that like the VOA 15 in FIG. 20, the VOA 38 may be the variable optical attenuator described in Japanese Patent Publication No. 5065333.

The control unit 33 requests the optical demultiplexer 37 to separate an optical signal having a given wavelength to be used as control signal light from the plurality of wavelengths included in a wavelength multiplexed optical signal and output the optical signal having the given wavelength to the VOA 38.

Further, the control unit 33 instructs the VOA 38 to attenuate (or not to attenuate) the optical signal having the given wavelength in accordance with the bit pattern of notification information for indicating a state of the optical relay device 3.

In response to the request from the control unit 33, the optical demultiplexer 37 separates the optical signal having the given wavelength specified by the control unit 33 and outputs the optical signal to the VOA 38. The optical demultiplexer 37 outputs the optical signals included in the wavelength multiplexed optical signal other than the optical signal input into the VOA 38 to the processing unit 32.

The processing unit 32 multiplexes the wavelength multiplexed optical signal input from the optical demultiplexer 37, the wavelength multiplexed optical signal input from the fourth filter unit 34-4 and the optical signal having the given wavelength input from the VOA 38 and outputs the resulting optical signal to the transmission path 2.

As described above, according to the eighth exemplary embodiment, the optical transmitter 1 or the optical relay device 3 includes the VOA 15 or the VOA 38 which outputs an optical signal whose intensity can be changed by an applied voltage. Because the intensity of an optical signal output from the VOA 15 or the VOA 38 can be changed on a per microsecond basis, the intensity of an optical signal having a given wavelength can be changed. The optical transmitter 1 or the optical relay device 3 therefore is capable of adjusting an optical signal having a given wavelength to control information or notification information even when the bit pattern of the control information or the notification information changes fast.

Ninth Exemplary Embodiment

Figure 22:
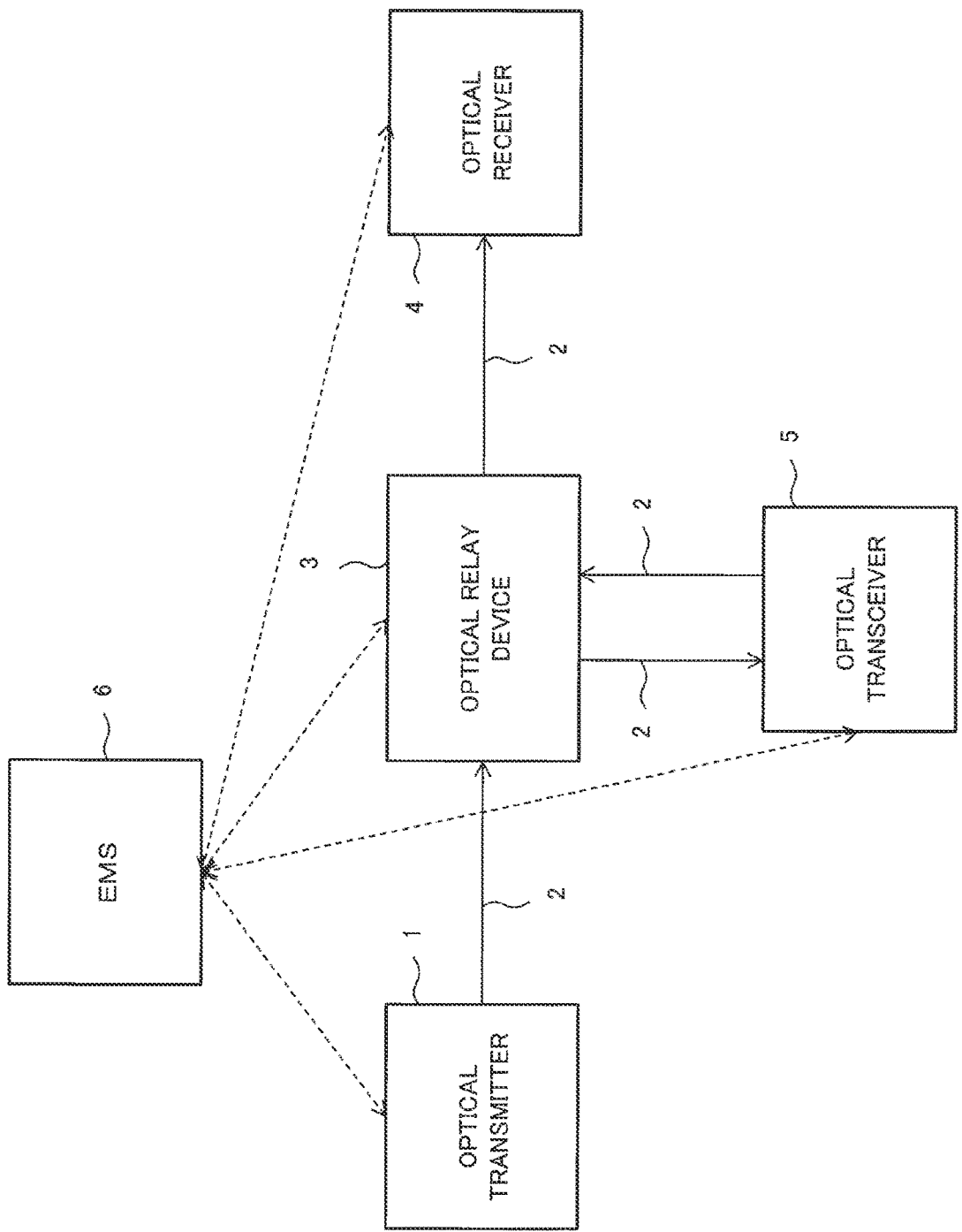
FIG. 22 is a diagram illustrating an exemplary configuration of an optical communication system according to a ninth exemplary embodiment of the present invention.

A ninth exemplary embodiment will be described with reference to a drawing. FIG. 22 is a diagram illustrating an exemplary configuration of an optical communication system according to the ninth exemplary embodiment. As illustrated in FIG. 22, the optical communication system includes an optical transmitter 1, a transmission path 2, an optical relay device 3, an optical receiver 4, an optical transceiver 5 and an EMS (Element Management System) 6.

Note that an exemplary configuration of the optical transmitter 1 in the ninth exemplary embodiment is similar to the exemplary configuration of the optical transmitter 1 illustrated in FIG. 2, FIG. 6 or FIG. 20. An exemplary configuration of the optical relay device 3 in the ninth exemplary embodiment is similar to the exemplary configuration of the optical relay device 3 illustrated in FIG. 4, FIG. 7, FIG. 11, FIG. 13, FIG. 14, FIG. 15, FIG. 17, FIG. 19 or FIG. 21. An exemplary configuration of the optical receiver 4 in the ninth exemplary embodiment is similar to the exemplary configuration of the optical receiver 4 illustrated in FIG. 9 or FIG. 12.

The EMS 6 is a device that performs network management for the optical communication system and manages wavelengths used for optical signals for data. The EMS 6 allocates a given wavelength to each of a plurality of clients as the wavelength of an optical signal for transmitting data. In addition, the EMS 6 changes the allocated given wavelength in response to needs of a client or occurrence of a failure, for example.

The EMS 6 indicates the wavelength of an optical signal to be used as control information to a control unit 13 of the optical transmitter 1 via a control signal. The control unit 13 of the optical transmitter 1 instructs a processing unit 12 to drop (or not to drop) an optical signal having the given wavelength specified in the control signal in accordance with the bit pattern of control information for controlling the optical relay device 3.

Further, the EMS 6 indicates a wavelength of an optical signal to be used by the optical transmitter 1 as control information to a filter unit 34, a first filter unit 34-1 or a local light output unit 36 of the optical relay device 3 via a control signal. In addition, the EMS 6 indicates a wavelength of an optical signal to be used by the optical transceiver 5 as control information to a second filter unit 34-2 of the optical relay device 3.

Based on the control signal provided from the EMS 6, the filter unit 34, the first filter unit 34-1 or the second filter unit 34-2 of the optical relay device 3 passes only an optical signal having the wavelength specified in the control signal. Based on the control signal provided from the EMS 6, the local light output unit 36 of the optical relay device 3 outputs local light having the given wavelength specified in the control signal.

Further, the EMS 6 indicates to a control unit 33 of the optical relay device 3 a wavelength of control signal light to be used by the optical relay device 3 for indicating a state of the optical relay device 3.

The control unit 33 of the optical relay device 3 instructs a processing unit 32 to drop (or not to drop) an optical signal having the given wavelength specified in the control signal provided from the EMS 6 in accordance with the bit pattern of notification information for indicating a state of the optical relay device 3.

Moreover, the EMS 6 indicates a wavelength of an optical signal to be used as control information or notification information to a filter unit 44 or a local light output unit 47 of the optical receiver 4.

Based on the control signal provided from the EMS 6, the filter unit 44 of the optical receiver 4 passes only an optical signal having the wavelength specified in the control signal. Based on the control signal provided from the EMS 6, the local light output unit 47 of the optical receiver 4 outputs local light of the given wavelength specified in the control signal.

Because the EMS 6 centrally manages wavelengths used as control signal light and indicates a wavelength to be used as control signal light to each device as described above in the ninth exemplary embodiment, the wavelengths can be flexibly changed in response to needs of a client or occurrence of a failure.

Tenth Exemplary Embodiment

A tenth exemplary embodiment will be described. In the tenth exemplary embodiment, a computer, a CPU (Central Processing Unit), an MPU (Micro-Processing Unit) or the like of an optical transmitter 1 or an optical relay device 3 executes software (a program) that implements the functions of any of the exemplary embodiments described above. Note that, in the tenth exemplary embodiment, the device that executes the software (program) is not limited to the optical transmitter 1 or the optical relay device 3 but instead any device may execute the software (program).

In the tenth exemplary embodiment, the optical transmitter 1 or the optical relay device 3 acquires the software (program) that implements the functions of any of the exemplary embodiments described above via any of various types of storage media such as a CD-R (Compact Disc Recordable), for example, or a network. The program or the storage medium storing the program acquired by the optical transmitter 1 or the optical relay device 3 constitutes the present invention. Note that the software (program) may be prestored in a given storage unit included in the optical transmitter 1 or the optical relay device 3, for example.

The computer, CPU, MPU or the like of the optical transmitter 1 or the optical relay device 3 reads and executes the program code of the acquired software (program).

The tenth exemplary embodiment is applicable to a program or the like to be implemented on the computer, CPU, MPU or the like of an optical transmitter 1 or an optical relay device 3.

While exemplary embodiments of the present invention have been described above, the present invention is not limited to the exemplary embodiments described above. The present invention can be carried out based on variations, substitutions or adjustments of the exemplary embodiments described above. Further, the present invention can be carried out by any combination of the exemplary embodiments. In other words, the present invention encompasses variations and modifications that can be implemented according to the entire disclosure and the technical ideas disclosed herein. The whole or part of the exemplary embodiments described above can be described as, but not limited to, the following Supplementary Notes.

[Supplementary Note 1]
An optical relay device including:
a light reception unit which receives a wavelength multiplexed optical signal;
a processing unit which is capable of filtering and outputting light power having a given wavelength included in the wavelength multiplexed optical signal; and
a control unit which controls the processing unit in such a way to intensity-modulate the optical signal having the given wavelength in the wavelength multiplexed optical signal received by the light reception unit.

[Supplementary Note 2]
The optical relay device according to Supplementary Note 1,
wherein the control unit controls the processing unit in such a way to intensity-modulate the optical signal having the given wavelength based on control information for another device on a transmission network.

[Supplementary Note 3]
The optical relay device according to Supplementary Note 1 or 2,
wherein the control unit controls the processing unit in such a way to intensity-modulate an optical signal used for transmitting control information to another device on the transmission network among a plurality of optical signals included in the wavelength multiplexed optical signal.

[Supplementary Note 4]
The optical relay device according to any one of Supplementary Notes 1 to 3,
wherein the control unit identifies the wavelength to be intensity-modulated in response to a control signal from an external source.

[Supplementary Note 5]
The optical relay device according to any one of Supplementary Notes 1 to 4,
wherein the processing unit intensity-modulates the optical signal having the given wavelength by filtering light power of the optical signal having the given wavelength.

[Supplementary Note 6]
The optical relay device according to any one of Supplementary Notes 1 to 5, further including a light output unit which outputs light having a given wavelength to the processing unit,
wherein the processing unit multiplexes and outputs the plurality of optical signals and light output from the light output unit.

[Supplementary Note 7]
The optical relay device according to any one of Supplementary Notes 1 to 6, further including a branching unit which separates the wavelength multiplexed optical signal received by the light reception unit into first branch light to be output to a first receiver side and a second branch light to be output to a second receiver side,
wherein the processing unit intensity-modulates at least one of the first or second branch light.

[Supplementary Note 8]
An optical communication system including:
an optical transmitter including,
a plurality of transmission units which output optical signals having different wavelengths, the optical signals being available for data communication;
a processing unit which multiplexes the plurality of optical signals output from the plurality of transmission units and outputs the resulting signal as a wavelength multiplexed optical signal; and
a control unit which controls the processing unit in such a way to intensity-modulate an optical signal having a given wavelength;
an optical communication device executing predetermined processing based on control information contained in the optical signal having the given wavelength; and
an optical communication device executing predetermined processing based on the control information contained in the optical signal having the given wavelength.

[Supplementary Note 9]
The optical communication system according to Supplementary Note 8,
wherein the control unit controls the processing unit in such a way to intensity-modulate the optical signal having the given wavelength based on control information for the optical receiver.

[Supplementary Note 10]
The optical communication system according to Supplementary Note 8 or 9,
wherein the control unit controls the processing unit in such a way to intensity-modulate the optical signal having the given wavelength to be used for transmitting the control information to the optical communication device among a plurality of optical signals included in the wavelength multiplexed optical signal.

[Supplementary Note 11]
The optical communication system according to any one of Supplementary Notes 8 to 10, further including a controller which provides a control signal specifying the given wavelength to the optical relay device, wherein the optical relay device identifies, in response to the control signal from the controller, the given wavelength to be intensity-modulated.

[Supplementary Note 12]

An optical communication method including:

receiving a wavelength multiplexed optical signal;

performing control to intensity-modulate an optical signal having the given wavelength in the received wavelength multiplexed optical signal; and filtering and outputting light power of the given wavelength included in the wavelength multiplexed optical signal based on the control.

[Supplementary Note 13]

The optical communication method according to Supplementary Note 12, wherein control is performed to intensity-modulate the optical signal having the given wavelength based on control information for another device on a transmission network.

[Supplementary Note 14]

The optical communication method according to Supplementary Note 12 or 13, wherein control is performed in such a way to intensity-modulate an optical signal to be used for transmitting control information to another device on a transmission network among a plurality of optical signals included in the wavelength multiplexed optical signal.

[Supplementary Note 15]

The optical communication method according to any one of Supplementary Notes 12 to 14, wherein the wavelength to be intensity-modulated is identified in response to a control signal from an external source.

[Supplementary Note 16]

The optical communication method according to any one of Supplementary Notes 12 to 15, wherein the optical signal having the given wavelength is intensity-modulated by filtering light power of the optical signal having the given wavelength.

[Supplementary Note 17]

The optical communication method according to any one of Supplementary Notes 12 to 16, wherein light having the given wavelength is output and the plurality of optical signals and the light having the given wavelength are multiplexed and output.

[Supplementary Note 18]

The optical communication method according to any one of Supplementary Notes 12 to 17, wherein the wavelength multiplexed optical signal is separated into first branch light to be output to a first receiver side and second branch light to be output to a second receiver side; and at least one of the first or second branch light is intensity-modulated.

[Supplementary Note 19]

An optical communication method including:

receiving a wavelength multiplexed optical signal;

performing control to intensity-modulate an optical signal having the given wavelength in the received wavelength multiplexed optical signal; and filtering and outputting light power having the given wavelength included in the wavelength multiplexed optical signal based on the control.

[Supplementary Note 20]

A program causing a computer to execute the steps of:

receiving a wavelength multiplexed optical signal;

performing control to intensity-modulate an optical signal having the given wavelength in the received wavelength multiplexed optical signal; and filtering and outputting light power having the given wavelength included in the wavelength multiplexed optical signal based on the control.

[Supplementary Note 21]

The program according to Supplementary Note 20, including the step of performing control in such a way to intensity-modulate the optical signal having the given wavelength based on control information for another device on a transmission network.

[Supplementary Note 22]

The program according to Supplementary Note 20 or 21, including the step of performing control in such a way to intensity-modulate an optical signal to be used for transmitting control information to another device on a transmission network among a plurality of optical signals included in the wavelength multiplexed optical signal.

[Supplementary Note 23]

The program according to any one of Supplementary Notes 20 to 22, including the step of, in response to a control signal from an external source, identifying the wavelength to be intensity-modulated.

[Supplementary Note 24]

The program according to any one of Supplementary Notes 20 to 23, including the step of intensity-modulating the optical signal having the given wavelength by filtering light power of the optical signal having the given wavelength.

[Supplementary Note 25]

The program according to any one of Supplementary Notes 20 to 24, including the steps of:

outputting the light having the given wavelength; and multiplexing and outputting the plurality of optical signals and the light having the given wavelength.

[Supplementary Note 26]

The program according to any one of Supplementary Notes 20 to 25, including the steps of:

separating the wavelength multiplexed optical signal into first branch light to be output to a first receiver side and second branch light to be output to a second receiver side; and intensity-modulating at least one of the first or second branch light.

INDUSTRIAL APPLICABILITY

The present invention is widely applicable to optical communication systems that transmit and receive a wavelength multiplexed optical signal on which an optical control signal containing control information is superimposed.

This application claims priority from Japanese Patent Application No. 2014-065013, filed on Mar. 27, 2014, the disclosure of which is hereby incorporated by reference in its entirety.

REFERENCE SIGNS LIST

1 Optical transmitter
2 Transmission path
3 Optical relay device
4 Optical receiver
5 Optical transceiver 6 EMS
11, 11-1, 11-N Transmission unit
12 Processing unit
13 Control unit
14 Light output unit
15 VOA
16 Optical demultiplexer
17 Optical multiplexer
30 Light reception unit
31 Optical branching unit
31-1 First optical branching unit
31-2 Second optical branching unit
31-3 Third optical branching unit
32 WSS
32-1 First processing unit
32-2 Second processing unit
33 Control unit
34 Filter unit
34-1 First filter unit
34-2 Second filter unit
34-3 Third filter unit
34-4 Fourth filter unit
35 Reception unit
36 Local light output unit
37 Optical demultiplexer
38 VOA
39 Light output unit

The invention claimed is:

1. An optical relay device comprising:
an optical brancher unit that receives a wavelength multiplexed optical signal;
a controller unit that specifies a first wavelength and outputs notification information;
a wavelength selector switch that selects an optical signal having the first wavelength from the received wavelength multiplexed optical signal, applies intensity-modulation in accordance with the notification information to the selected optical signal by filtering light power of the optical signal having the first wavelength in accordance with the notification information, adds the intensity-modulated optical signal back to the wavelength multiplexed optical signal, and outputs the wavelength multiplexed optical signal; and
a light output source that generates dummy light having a wavelength, being different from the first wavelength, for compensating for a change in optical intensity of the optical signal having the first wavelength due to the filtering, and outputs the dummy light to the wavelength selector switch.

2. The optical relay device according to claim 1, wherein the wavelength selector switch includes a variable optical attenuator which attenuates light power of the optical signal having the specified wavelength in accordance with the notification information.

3. The optical relay device according to claim 1, wherein the controller unit outputs notification information for indicating a state of the optical relay device.

4. The optical relay device according to claim 1, wherein the controller unit specifies the first wavelength in accordance with a control signal input from an external source.

5. The optical relay device according to claim 1, wherein the brancher unit branches the received wavelength multiplexed optical signal and outputs one of the wavelength multiplexed optical signals to an external destination and the other to the wavelength selector switch.

6. The optical relay device according to claim 1, wherein
the wavelength multiplexed optical signal is a combination of an optical signal having a second wavelength to which intensity-modulation in accordance with control information is applied and a plurality of optical signals having wavelengths different from the second wavelength;
the wavelength selector switch extracts an optical signal having the second wavelength from the received wavelength multiplexed optical signal based on an input control signal; and
the controller unit acquires the control information from the extracted optical signal having the second wavelength and performs predetermined control based on the acquired control information.

7. The optical relay device according to claim 6, wherein
the control information is information that specifies the first wavelength; and
the controller unit specifies the first wavelength based on the acquired control information.

8. The optical relay device according to claim 1, wherein the controller unit outputs notification information for indicating a state of the optical relay device.

9. The optical relay device according to claim 1, wherein the controller unit specifies the first wavelength in accordance with a control signal input from an external source.

10. The optical relay device according to claim 1, wherein the optical brancher unit branches the received wavelength multiplexed optical signal and outputs one of the wavelength multiplexed optical signals to an external destination and the other to the wavelength selector switch.

11. The optical relay device according to claim 1, wherein
the wavelength multiplexed optical signal is a combination of an optical signal having a second wavelength to which intensity-modulation in accordance with control information is applied and a plurality of optical signals having wavelengths different from the second wavelength;
the wavelength selector switch extracts an optical signal having the second wavelength from the received wavelength multiplexed optical signal based on an input control signal; and
the controller unit acquires the control information from the extracted optical signal having the second wavelength and performs predetermined control based on the acquired control information.

12. An optical communication system comprising an optical transmitter and an optical relay device,
the optical transmitter comprising:
a plurality of transmitter units that outputs optical signals having different wavelengths, the optical signals being available for data communication;
a transmitting-side wavelength selector switch that multiplexes the plurality of output optical signals into a wavelength multiplexed optical signal and transmits the wavelength multiplexed optical signal; and
a transmitting-side controller unit that specifies a second wavelength and outputs control information;
the optical relay device comprising:
an optical brancher unit that receives the wavelength multiplexed optical signal;
a receiving-side controller unit that specifies a first wavelength and outputs notification information; and
a receiving-side wavelength selector switch that selects an optical signal having the first wavelength from the received wavelength multiplexed optical signal, applies intensity-modulation in accordance with the notification information to the selected optical signal, adds the intensity-modulated optical signal back to the wavelength multiplexed optical signal, outputs the wavelength multiplexed optical signal, and extracts the optical signal having the second wavelength from the received wavelength multiplexed optical signal, wherein the receiving-side controller unit acquires the control information from the extracted optical signal having the second wavelength and performs predetermined control based on the acquired control information.

13. The optical communication system according to claim 12, wherein
the transmitting-side unit outputs control information for controlling the optical relay device; and
the receiving-side controller unit outputs notification information for indicating a state of the optical relay device.

14. The optical communication system according to claim 12, further comprising a controller which transmits a control signal for specifying the second wavelength, wherein
the transmitting-side controller unit and the receiving-side wavelength selector switch identify the second wavelength in accordance with the received control signal; and
the receiving-side controller unit identifies the first wavelength based on the acquired control information.

15. An optical relay method comprising:
receiving a wavelength multiplexed optical signal; specifying a first wavelength and outputting notification information;
selecting an optical signal having the first wavelength from the received wavelength multiplexed optical signal, applying intensity-modulation by filtering in accordance with the notification information to the selected optical signal, adding the intensity-modulated optical signal back to the wavelength multiplexed optical signal and outputting the wavelength multiplexed optical signal;
generating dummy light having a wavelength, being different from the first wavelength, for compensating for a change in optical intensity of the optical signal having the first wavelength due to the filtering; and outputting the dummy light.

16. An optical relay device comprising:
an optical brancher unit that receives a wavelength multiplexed optical signal;
a controller unit that specifies a first wavelength and outputs notification information;
a wavelength selector switch that selects an optical signal having the first wavelength from the received wavelength multiplexed optical signal, applies intensity-modulation in accordance with the notification information to the selected optical signal by filtering light power of the optical signal having the first wavelength in accordance with the notification information, adds the intensity-modulated optical signal back to the wavelength multiplexed optical signal, and outputs the wavelength multiplexed optical signal, wherein the wavelength selector switch includes a variable optical attenuator which attenuates light power of the optical signal having the specified wavelength in accordance with the notification information; and
a light output source that generates dummy light having a wavelength, being different from the first wavelength, for compensating for a change in optical intensity of the optical signal having the first wavelength due to the filtering, and outputs the dummy light to the wavelength selector switch.

* * * * *